United States Patent
Xie

(10) Patent No.: US 6,608,723 B2
(45) Date of Patent: Aug. 19, 2003

(54) INTEGRATED PUMP COMBINING MODULE

(75) Inventor: Ping Xie, San Jose, CA (US)

(73) Assignee: Finisar Corporation, Sunnyvale, CA (US)

(*) Notice: Subject to any disclaimer, the term of this patent is extended or adjusted under 35 U.S.C. 154(b) by 52 days.

(21) Appl. No.: 09/972,527

(22) Filed: Oct. 5, 2001

(65) Prior Publication Data

US 2002/0135882 A1 Sep. 26, 2002

Related U.S. Application Data

(60) Provisional application No. 60/276,748, filed on Mar. 16, 2001.

(51) Int. Cl.[7] ........................ G02B 27/10; G02B 27/28; G02B 5/30
(52) U.S. Cl. ........................ 359/618; 359/494; 359/495; 359/497
(58) Field of Search ................. 359/494, 495, 359/496, 497, 618; 385/11

(56) References Cited

U.S. PATENT DOCUMENTS

| | | | |
|---|---|---|---|
| 5,402,509 A | 3/1995 | Fukushima | 385/33 |
| 5,581,640 A * | 12/1996 | Pan et al. | 385/11 |
| 5,982,539 A * | 11/1999 | Shirasaki | 359/484 |
| 6,018,418 A | 1/2000 | Pan et al. | 359/495 |
| 6,038,357 A | 3/2000 | Pan | 385/24 |
| 6,407,836 B1 * | 6/2002 | Fukushima | 359/124 |

FOREIGN PATENT DOCUMENTS

JP         2002162610 A   *   6/2002

* cited by examiner

Primary Examiner—Ricky Mack
(74) Attorney, Agent, or Firm—Workman, Nydegger & Seeley

(57) ABSTRACT

The present invention is directed to an integrated polarization combining wavelength division multiplexer (IPWDM). The IPWDM of the invention provides optical polarization beam splitting/combining, wavelength division multiplexing, and reverse optical path isolation. In one embodiment, the IPWDM comprises a wavelength division multiplexer between two beam angle turners. In an exemplary implementation, the beam angle turners are implemented as a Faraday rotator between two birefringent wedges, while the wavelength division multiplexer is implemented as a thin film dielectric band splitter.

39 Claims, 16 Drawing Sheets

(Top View)

(Side View)

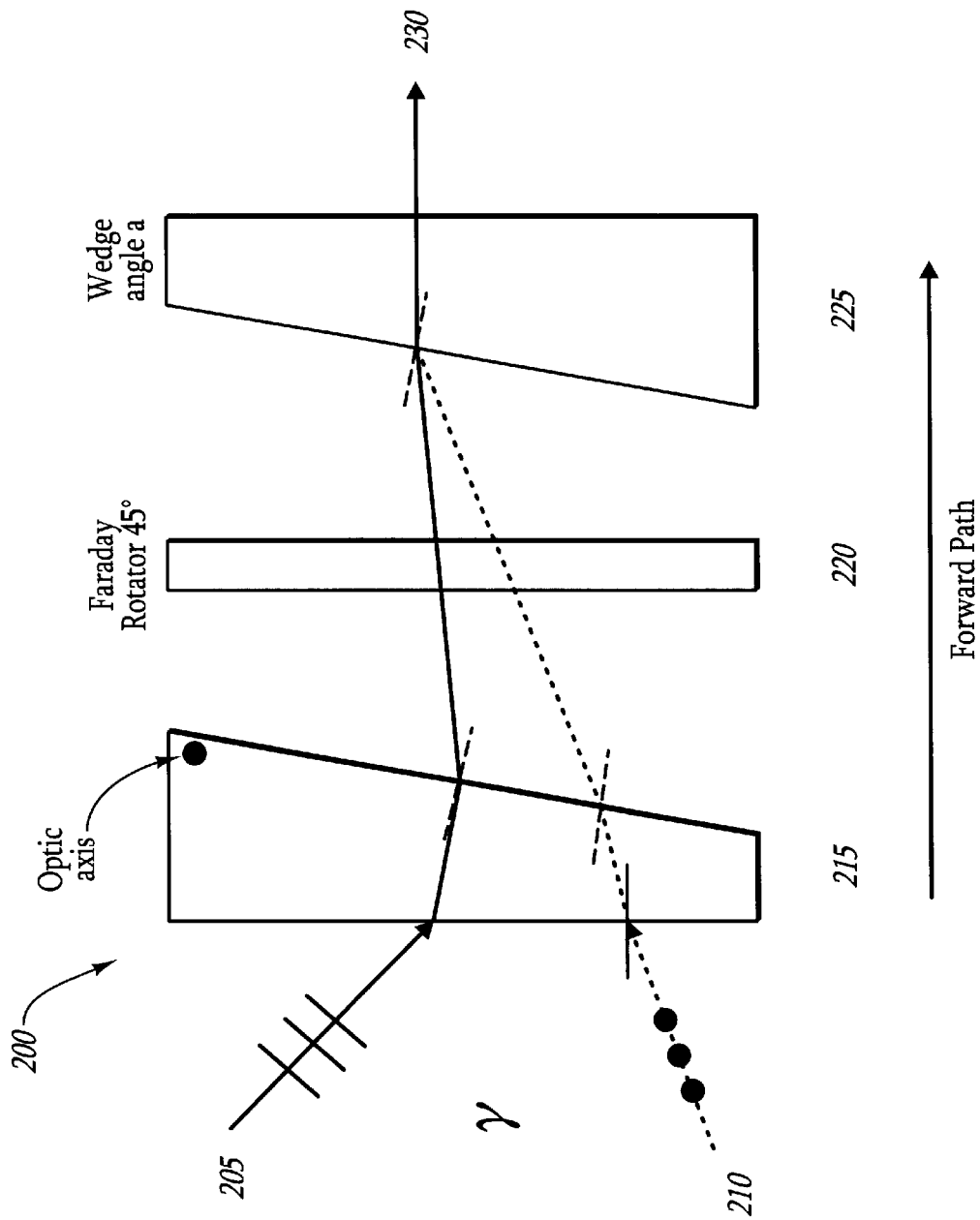
Fig. 2a (Top View, Forward Path)

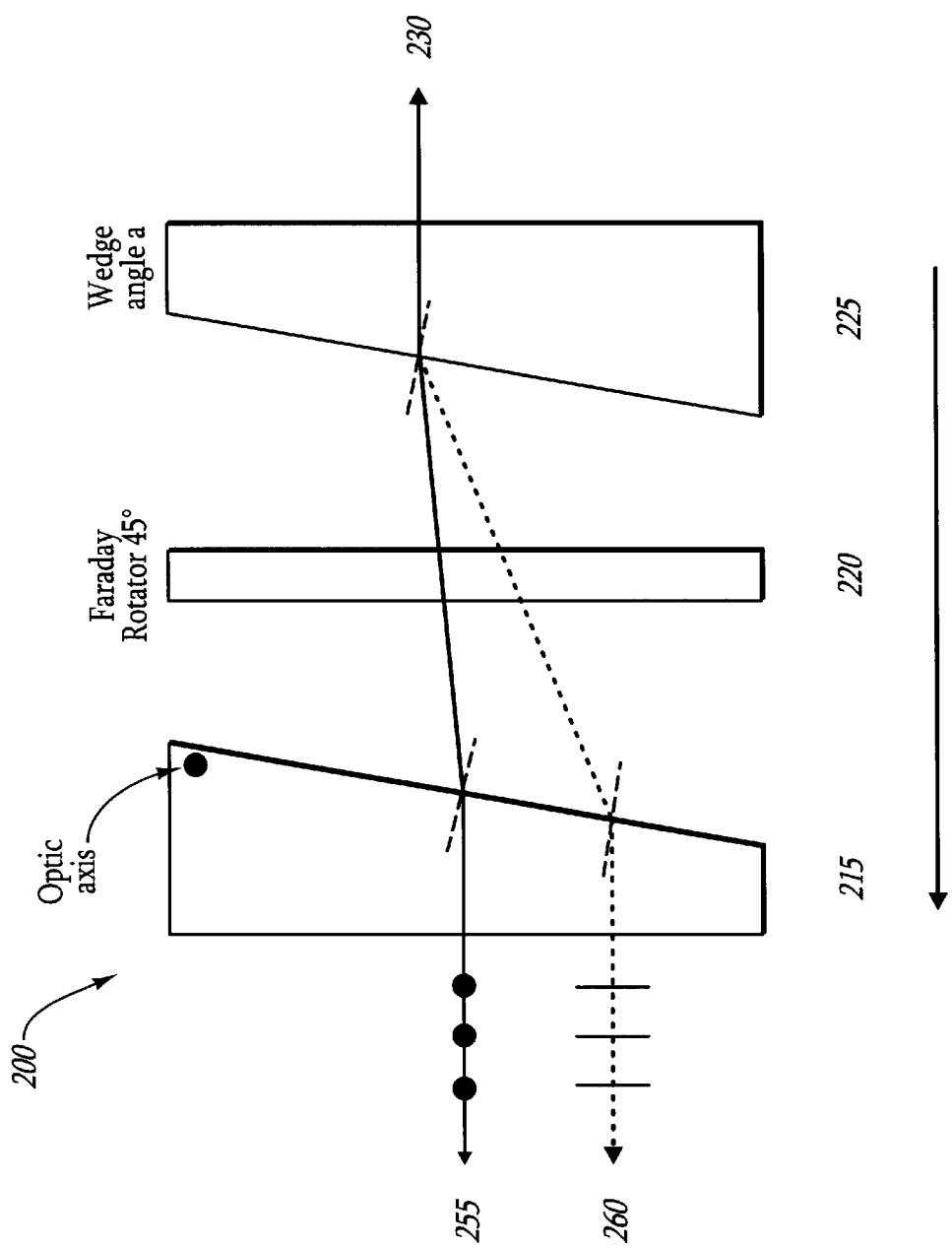
Fig. 2b (Top View, Reverse Path)

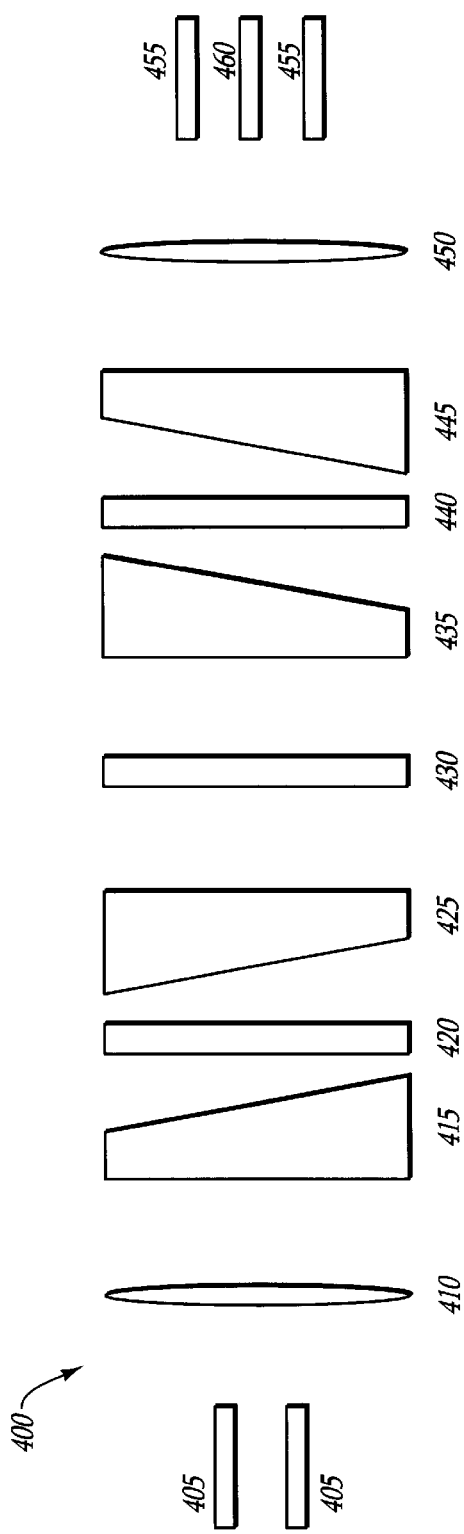
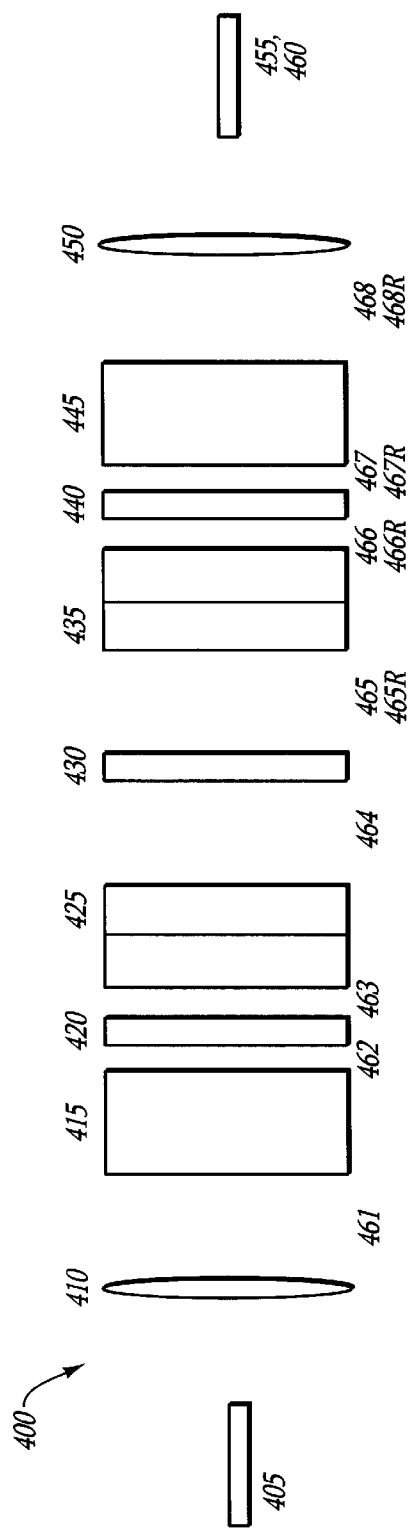

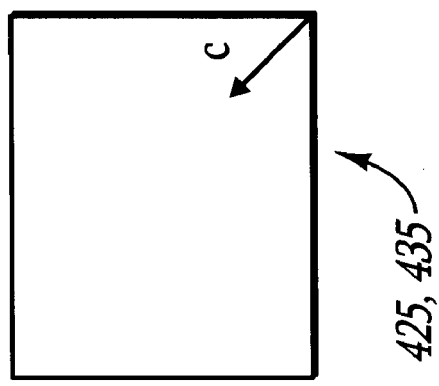
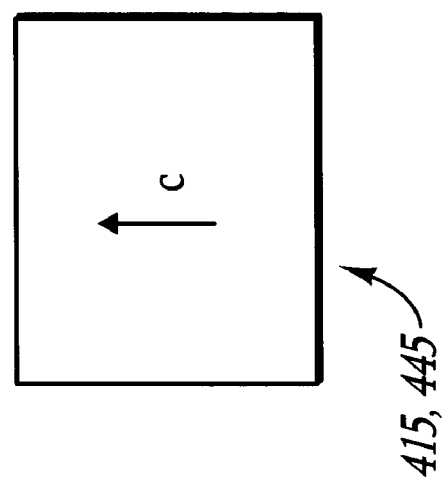
Fig. 4c
(Front View, viewed from $\lambda_1$ input side)

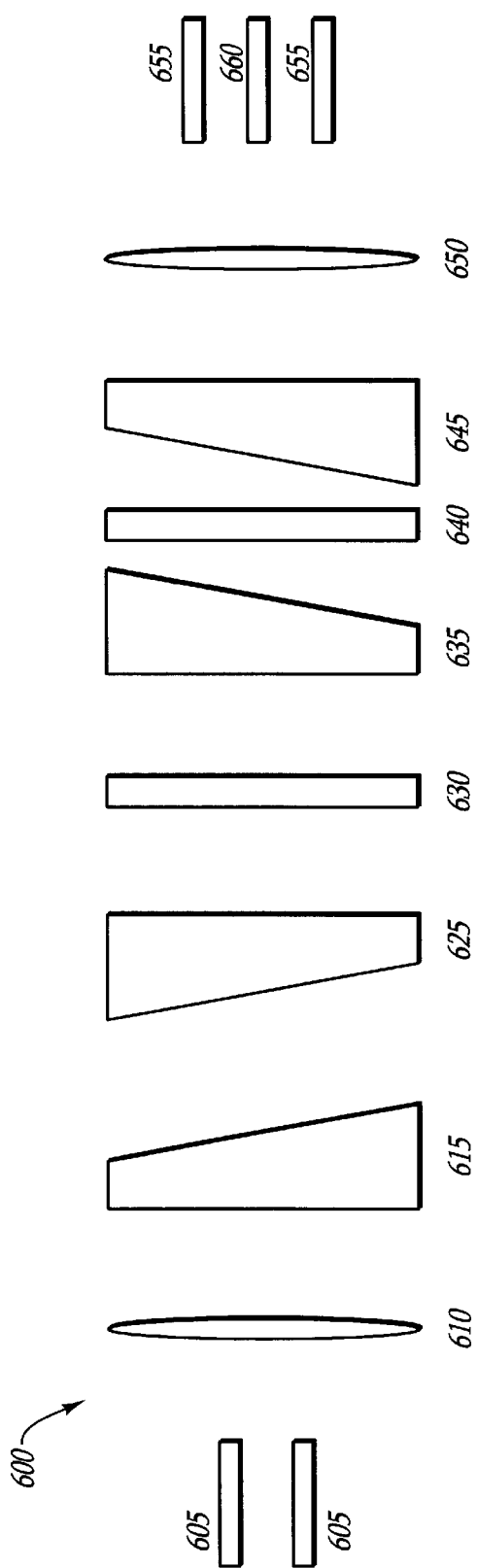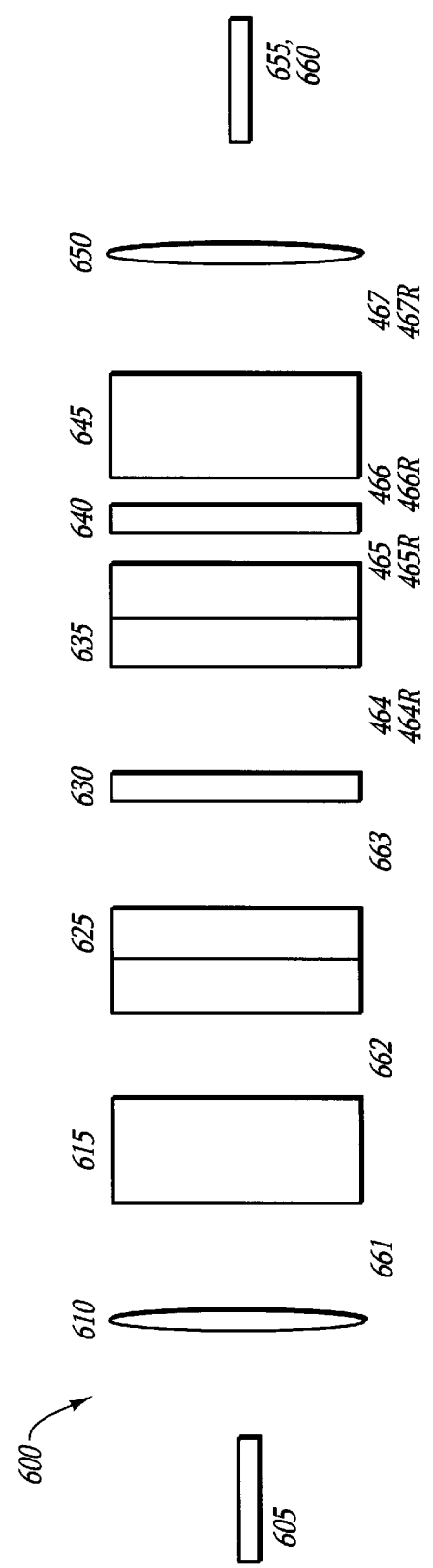
Fig. 6a (Top View)
Fig. 6b (Side View)

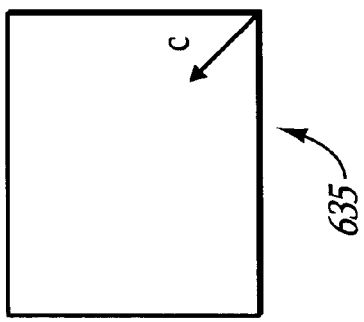
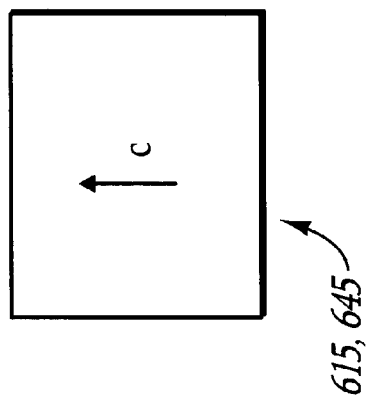 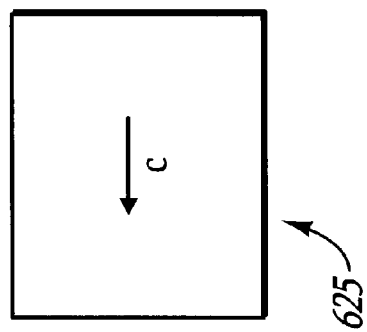
Fig. 6c
(Front View, viewed from $\lambda_1$ input side)

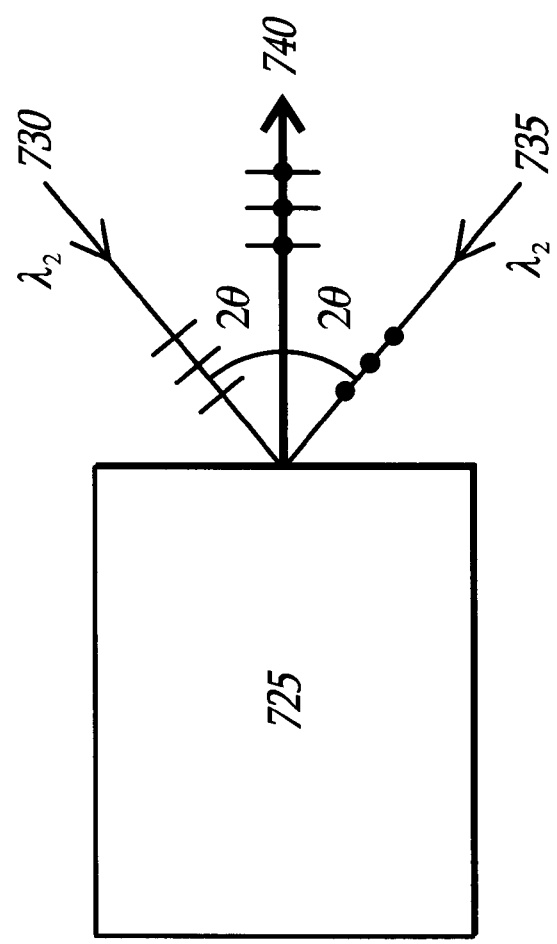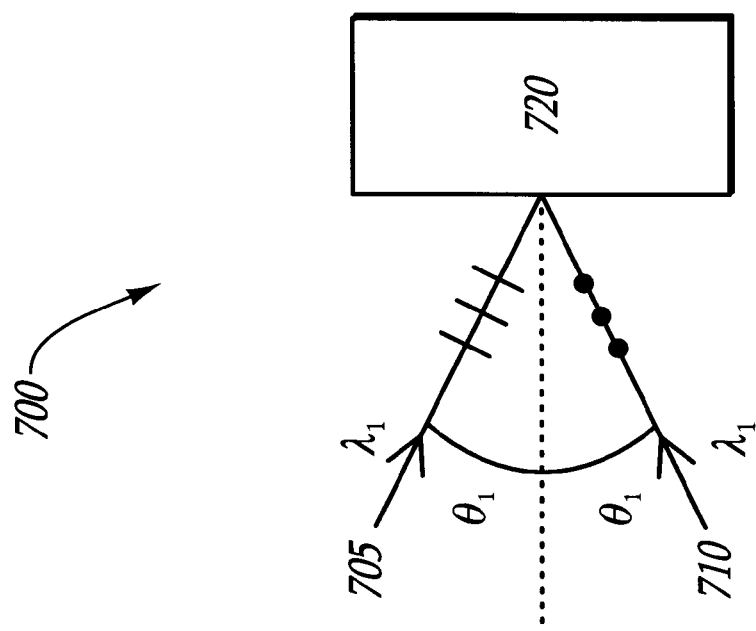
Fig. 7

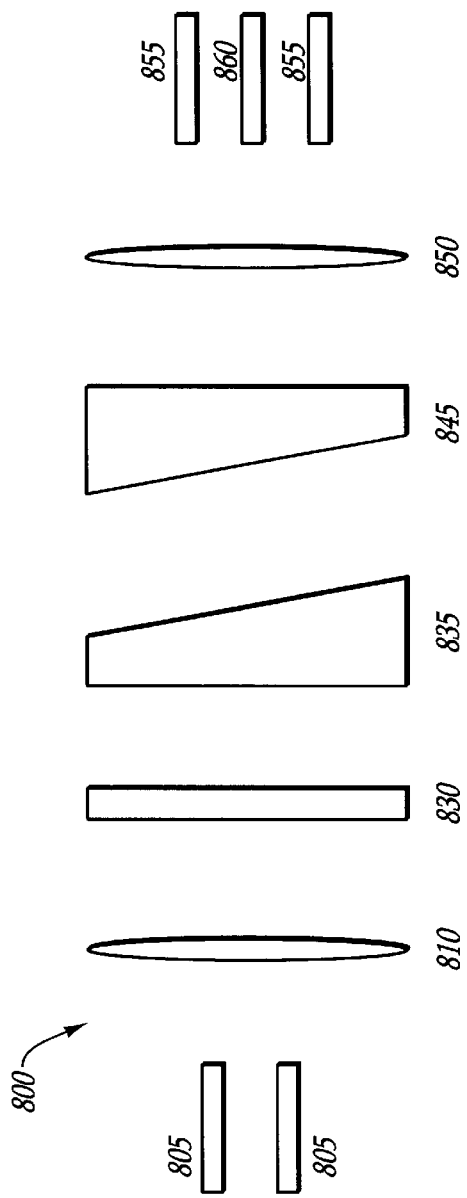
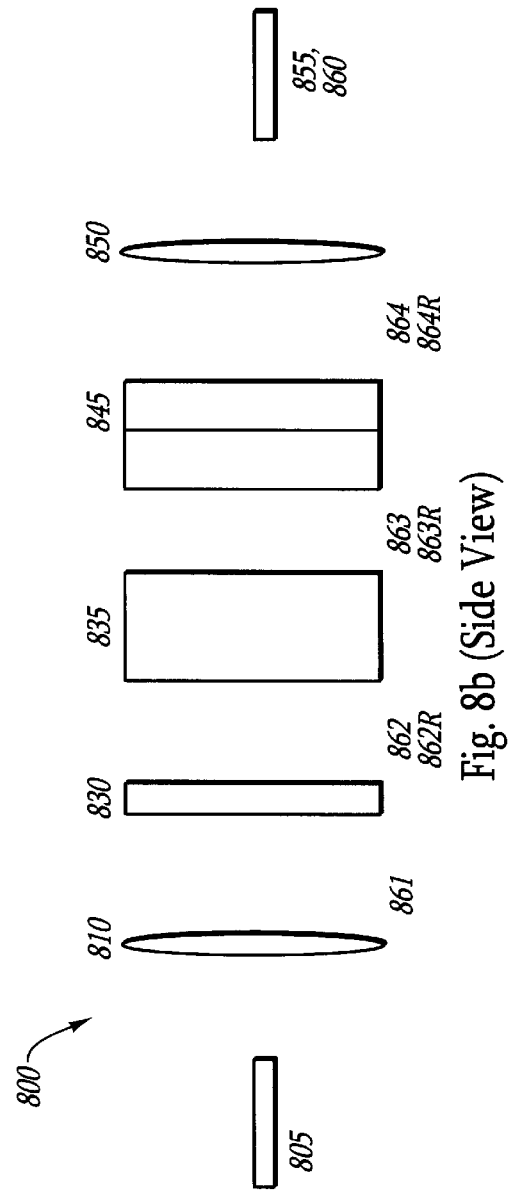
Fig. 8a (Top View)
Fig. 8b (Side View)

(Front View, viewed from $\lambda_1$ input side)

INTEGRATED PUMP COMBINING MODULE

CROSS-REFERENCE TO RELATED APPLICATIONS

This non-provisional application claims priority to Provisional Application No. 60/276,748, filed Mar. 16, 2001, which is hereby incorporated by reference in its entirety.

TECHNICAL FIELD OF THE INVENTION

The present invention relates to pump beam combination techniques, and more particularly to a device which provides polarization beam combining, wavelength division multiplexing, and isolation in the reverse path.

BACKGROUND OF THE INVENTION

In order to increase pump power input to optical amplifiers such as EDFA, PDFA, and Raman Amplifiers, beams from multiple input lasers are typically combined. FIG. 1 shows an approach typical of the prior art for combining pump input laser beams. In this example, two pump laser beams 105, 110 with wavelength $\lambda_1$ and power P but orthogonal polarizations are fed into a first polarization beam combiner (PBC) 120. (Beam 105 is horizontally polarized, i.e. polarized in the plane of the page, while beam 110 is vertically polarized, i.e. polarized perpendicular to the plane of the page.) Similarly, two laser beams 130, 135 with wavelength $\lambda_2$ and power P but orthogonal polarizations are fed into a second PBC 145. Through the action of the PBCs 120 and 145, the two beams 105, 110 at $\lambda_1$ are combined into a beam having power 2P, as are the beams 130, 135 at $\lambda_2$. The combined beams 125 and 150, respectively, then enter a Wavelength Division Multiplexer (WDM) 155, which combines the two beams into a single beam 160 of power 4P (neglecting loss) with wavelengths $\lambda_1$ and $\lambda_2$. In order to prevent undesirable feedback, for example system noise, along the reverse path to the pump lasers, isolators are used at the output (165) and optionally at the four inputs (115, 140) to the PBCs. Typically, $\lambda_1$ and $\lambda_2$ will be in the range of about 1400 nm to about 1550 nm but may also be in the range of about 1000 nm to about 1600 nm. The input beams to the PBCs are typically carried through polarization maintaining (PM) optical fibers. The output of the PBCs and WDM are typically carried through single mode (SM) optical fibers.

According to the prior art, therefore, at least four discreet optical components are required to provide a combined pump laser output: two PBCs, one WDM, and at least one isolator.

SUMMARY OF THE INVENTION

The invention provides systems and methods for combining optical beams.

In one embodiment, the method comprises providing a first beam angle turner which includes first and second birefringent wedges and a first Faraday rotator disposed between the first and second wedges, providing a second beam angle turner which includes third and fourth birefringent wedges and a second Faraday rotator disposed between the third and fourth wedges, providing a wavelength division multiplexer (WDM) that is disposed between the first and second beam angle turners and that transmits light of a first wavelength and that reflects light of a second wavelength, receiving and combining into a first combined exit beam first and second optical beams of the first wavelength, receiving and combining into a second combined exit beam third and fourth optical beams of the second wavelength, and transmitting the first combined exit beam and reflecting the second combined exit beam. The first and second wedges and the first Faraday rotator are disposed in relation to each other and contoured such that the first and second optical beams incident on the first wedge at a first prescribed separation angle are combined into the first combined exit beam at the first wavelength that exits the second wedge opposite the first Faraday rotator. The third and fourth wedges and the second Faraday rotator are disposed in relation to each other and contoured such that the third and fourth optical beams incident on the third wedge at a second prescribed separation angle are combined into the second combined exit beam that exits the fourth wedge opposite the second Faraday rotator. The first beam angle turner, the second beam angle turner and the WDM are disposed in relation to each other such that the first combined exit beam that exits the second wedge passes through the WDM and is incident upon the fourth wedge opposite the second Faraday rotator and such that the second combined exit beam that exits the fourth wedge is reflected by the WDM and is incident upon the fourth wedge opposite the second Faraday rotator. The third and fourth wedges, the second Faraday rotator and the WDM are further disposed in relation to each other and contoured such that the first combined exit beam passes through the second beam angle turner and exits the third wedge and follows an exit beam path intersecting the third wedge opposite the second Faraday rotator, the second combined exit beam passes back through the second beam angle turner and exits the third wedge opposite the second Faraday rotator and joins the exit beam path, light of the first wavelength reflected back along the exit beam path passes through the second beam angle turner and passes through the WDM, and light of the second wavelength that is reflected back along the exit beam path passes through the second beam angle turner, is reflected from the WDM and passes again back through the second beam angle turner and exits the third wedge without interfering with either the third or fourth incident beams. The first and second wedges, the first Faraday rotator and the WDM are further disposed in relation to each other and are contoured such that the reflected light of the first wavelength, that is reflected back along the exit beam path through the second beam angle turner and the WDM, passes through the first beam angle turner and exits the first wedge without interfering with either the first or second incident beams. The first combined exit beam comprising the first and second incident beams of the first wavelength and the second combined exit beam comprising the third and fourth incident beams of the second wavelength are combined into a third combined exit beam that follows the exit beam path and that includes the first and second wavelengths. Reflected light reflected back along the exit beam path is isolated from the first, second, third and fourth incident beams.

In another embodiment, the method comprises providing a first beam angle turner which includes first and second birefringent wedges, providing a second beam angle turner which includes third and fourth birefringent wedges and a Faraday rotator disposed between the third and fourth wedges, providing a wavelength division multiplexer (WDM) that is disposed between the first and second beam angle turners and that transmits light of a first wavelength and that reflects light of a second wavelength, receiving and combining into a first combined exit beam first and second optical beams of the first wavelength, receiving and combining into a second combined exit beam third and fourth optical beams of the second wavelength, and transmitting the first combined exit beam and reflecting the second combined exit beam. The first and second wedges are disposed in relation to each other and contoured such that the first and second optical beams incident on the first wedge at a first prescribed separation angle are combined into the first combined exit beam at the first wavelength that exits the second wedge opposite the first wedge rotator. The third and fourth wedges and the Faraday rotator are disposed in relation to each other and contoured such that the third and fourth optical beams incident on the third wedge at a second prescribed separation angle are combined into the second combined exit beam that exits the fourth wedge opposite the Faraday rotator. The first beam angle turner, the second beam angle turner and the WDM are disposed in relation to each other such that that the first combined exit beam that exits the second wedge passes through the WDM and is incident upon the fourth wedge opposite the Faraday rotator and such that the second combined exit beam that exits the fourth wedge is reflected by the WDM and is incident upon the fourth wedge opposite the Faraday rotator. The third and fourth wedges, the Faraday rotator and the WDM are further disposed in relation to each other and contoured such that the first combined exit beam passes through the second beam angle turner and exits the third wedge and follows an exit beam path intersecting the third wedge opposite the Faraday rotator, the second combined exit beam passes back through the second beam angle turner and exits the third wedge opposite the Faraday rotator and joins the exit beam path, light of the first wavelength reflected back along the exit beam path passes through the second beam angle turner and passes through the WDM, and light of the second wavelength that is reflected back along the exit beam path passes through the second beam angle turner, is reflected from the WDM and passes again back through the second beam angle turner and exits the third wedge without interfering with either the third or fourth incident beams. The first and second wedges and the WDM are further disposed in relation to each other and are contoured such that the reflected light of the first wavelength, that is reflected back along the exit beam path through the second beam angle turner and the WDM, passes through the first beam angle turner and exits the first wedge without interfering with either the first or second incident beams. The first combined exit beam comprising the first and second incident beams of the first wavelength and the second combined exit beam comprising the third and fourth incident beams of the second wavelength are combined into a third combined exit beam that follows the exit beam path and that includes the first and second wavelengths. Reflected light reflected back along the exit beam path is isolated from the first, second, third and fourth incident beams.

In another embodiment, the method comprises providing a beam angle turner which includes first and second birefringent wedges, providing a wavelength division multiplexer (WDM) having a first surface facing the first wedge opposite the second wedge that transmits light of a first wavelength and that reflects light of a second wavelength, providing first and second polarization maintaining (PM) fiber terminations facing a second surface of the WDM opposite the first surface, providing a first collimating lens disposed between the second surface of the WDM and the first and second PM fiber terminations, providing third and fourth PM fiber terminations facing the second wedge opposite the first wedge, providing an exit beam optical fiber termination disposed between the third and fourth PM fiber terminations and facing the second wedge opposite the first wedge, providing a second collimating lens disposed between the second wedge and the third and fourth PM fiber terminations and the exit beam optical fiber termination, launching first and second optical beams of the first wavelength, transmitting and combining the first and second optical beams into a first combined exit beam, launching third and fourth optical beams of the second wavelength, and deflecting, reflecting, and combining the third and fourth optical beams into a second combined exit beam. The first and second PM fiber terminations, first collimating lens, and WDM are disposed in relation to each other such that the first and second optical beams of the first wavelength, launched from the first and second PM fiber terminations, respectively, through the first collimating lens and incident on the first wedge at a first separation angle $\Theta$ are transmitted by the WDM. The WDM and first and second wedges are disposed in relation to each other, and the first and second wedges are contoured such that, the first and second transmitted optical beams of the first wavelength are combined into a first combined exit beam at the first wavelength that exits the second wedge opposite the first wedge. The third and fourth PM fiber terminations, second collimating lens, and first and second wedges are disposed in relation to each other, and the first and second wedges are contoured such that the third and fourth optical beams of the second wavelength, launched from the third and fourth PM fiber terminations, respectively, through the second collimating lens and incident on the second wedge opposite the first wedge at a separation angle $2\Theta$ pass through the beam angle turner and are deflected so as to be incident upon the first surface of the WDM at a second separation angle $\Theta$ and reflected from the first surface. The WDM and first and second wedges are disposed in relation to each other, and the first and second wedges are contoured such that the third and fourth reflected optical beams of the second wavelength are incident upon the first wedge opposite the second wedge and combined into a second combined exit beam at the second wavelength that exits the second wedge opposite the first wedge. The first and second wedges and the WDM are further disposed in relation to each other and contoured such that the first combined exit beam exits the second wedge and follows an exit beam path intersecting the second wedge opposite the first wedge, and the second combined exit beam exits the second wedge opposite the first wedge and joins the exit beam path. The first combined exit beam comprising the first and second incident beams of the first wavelength and the second combined exit beam comprising the third and fourth incident beams of the second wavelength are combined into a third combined exit beam that follows the exit beam path and that includes the first and second wavelengths. The third combined exit beam is received at the exit beam optical fiber termination.

BRIEF DESCRIPTION OF THE DRAWINGS

Embodiments of the invention will now be described by way of example with reference to the drawings in which:

FIG. 2a shows the forward path through an exemplary implementation of a polarization beam combiner with isolation in the reverse path (IPBC), viewed from the top of the device.

FIG. 2b shows the reverse path through the IPBC of FIG. 2a.

FIG. 4a shows a top view of an exemplary implementation of the IPWDM of FIG. 3.

FIG. 4b shows a side view of the IPWDM of FIG. 4a.

FIG. 4c shows the orientation of the optic axis of each of the wedges of the IPWDM of FIG. 4a.

FIG. 5b schematically shows the reverse path for feedback at $\lambda_1$ in the IPWDM of FIG. 5a.

FIG. 6a shows a top view of an exemplary implementation of the IPWDM of FIGS. 5a and 5b.

FIG. 6b shows a side view of the IPWDM of FIG. 6a.

FIG. 6c shows the orientation of the optic axis of each of the wedges of the IPWDM of FIG. 6a.

FIG. 7 shows a functional diagram of another embodiment of an IPWDM.

FIG. 8a shows a top view of an exemplary implementation of the IPWDM of FIG. 7.

FIG. 8b shows a side view of the IPWDM of FIG. 8a.

FIG. 8c shows the orientation of the optic axis of each of the wedges of the IPWDM of FIG. 8a.

DETAILED DESCRIPTION OF THE PREFERRED EMBODIMENTS

Figure 1:
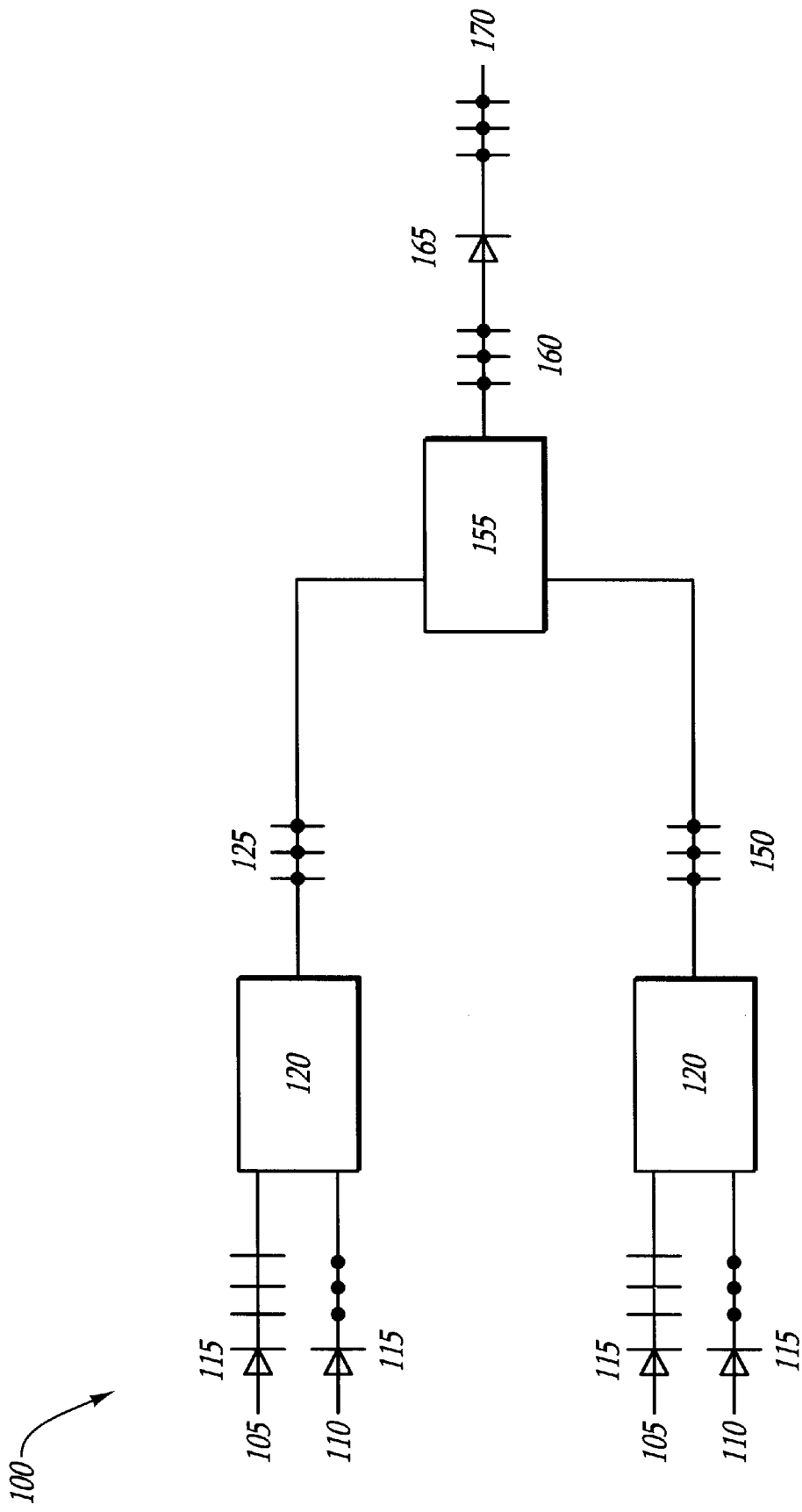
FIG. 1 shows a prior art system for combining pump input laser beams.

The present invention is directed to an optical device which may be called an integrated polarization combining wavelength division multiplexer (IPWDM). The IPWDM of the invention provides optical polarization beam splitting/combining, wavelength division multiplexing, and reverse optical path isolation.

Incorporated herein by reference in their entirety are U.S. Provisional Patent Application entitled, "HYBRID OPTICAL POLARIZATION BEAM SPLITTER/COMBINER WITH BUILT-IN OPTICAL ISOLATOR" filed Jan. 10, 2001, Ser. No. 06/261,179, listing as inventors Yonglin Huang, Meng Ma, and Shuqing Ma; and corresponding U.S. utility patent application METHOD AND APPARATUS FOR A POLARIZATION BEAM SPLITTER/COMBINER WITH AN INTEGRATED OPTICAL ISOLATOR, filed Jul. 5, 2001, Ser. No. 09/900,091. The aforementioned patent applications disclose a polarization beam combiner with optical isolation in the reverse path (IPBC) which provides optical polarization beam splitting/combining and reverse optical path isolation. The operation of an embodiment of the IPBC disclosed in the aforementioned provisional application, shown in FIGS. 2a and 2b, will now be described.

IPBC 200 comprises two birefringent wedges 215, 225 with an intervening Faraday rotator 220. The IPBC receives linearly polarized input optical beams 205 and 210 having mutually orthogonal polarizations at a given wavelength, and polarization combines the two beams into a polarization combined exit beam 230. The birefringent wedges may be composed of $YVO_4$, Rutile, Calcite, $LiNbO_3$, or any other birefringent crystal. The Faraday rotator is a material, such as garnet, which rotates the polarization of linearly polarized light of any wavelength (for wavelengths transmitted by the rotator) in the same direction, when viewed from the point of view of a stationary observer, regardless of whether the light is propagating along a forward path through the rotator, as in FIG. 2a, or along a reverse path, as in FIG. 2b. In this embodiment, the Faraday rotator is chosen so as to rotate the polarization by 45° clockwise, when viewed from the source of input beams 205 and 210, regardless of whether the beams are propagating along the forward path through the device (from the input beam source side of the device to the exit beam side), or along the reverse path (from the exit beam side of the device toward the input beam source side). Input optical beams 205 and 210 may be provided by one or more lasers and have, in certain applications, a wavelength between about 1400 nm to 1500 nm. It is contemplated, however, that any suitable wavelength outside this range may also be used. Wedges 215 and 225 are configured so as to have optic axes with prescribed orientations. In this embodiment, the optic axes should be at an angle of 45° or 135° to each other. As shown in FIGS. 2a and 2b, the optic axis of wedge 215 is normal to the plane of the paper. The optic axis of wedge 225 is at 45° to the optic axis of wedge 215. This configuration is the same as that for wedges 415 and 425 in FIG. 4a, and is illustrated in FIG. 4c.

Input beams 205 (solid line) and 210 (dotted line) are incident on wedge 215 with a separation angle γ. Beam 205 is polarized in the plane of the paper, while beam 210 is polarized in the plane normal to the plane of the paper. As will be understood by those skilled in the art, and as described, for example, in Eugene Hecht, "Optics," Third Edition, in particular in Section 8.4, "Birefringence," at pages 330–340, because beam 210 is polarized parallel to the optic axis of wedge 215, it is an e-ray with respect to wedge 215 and "sees" an index of refraction $n_e$. Similarly, beam 205 is an o-ray with respect to wedge 205 because it is polarized normal to the optic axis of wedge 215 and sees an index of refraction $n_o$. In the exemplary embodiment shown in FIGS. 2a and 2b, it is assumed that $n_o > n_e$, as is the case, for example, in Calcite. Beams 205 and 210 are deflected be wedge 215, pass through Faraday rotator 220, which rotates the polarization of both beams 45° clockwise (viewing the device from the input beam source side), and are incident on wedge 225. The polarization of polarization rotated beam 205 is now parallel to the optic axis of wedge 225 and is therefore an e-ray with respect thereto, while polarization rotated beam 210 is now an o-ray with respect wedge 225. Polarization rotated beams 205 and 210 are deflected toward the normal in wedge 225 and combined into polarization combined exit beam 230 which propagates along an exit beam path away from the IPBC.

The isolation function of the IPBC will now be described with reference to FIG. 2b, which shows the reverse path through the device, namely the optical path taken by reflected feedback. Reflected polarization combined light beam 240 reflected back along the exit beam path toward the IPBC is incident on wedge 225 normal to the surface and undergoes no deflection. The component of beam 240 corresponding to polarization rotated beam 210, namely that component of beam 240 having the same polarization as polarization rotated beam 210, is an o-ray with respect to wedge 225. The component of beam 240 corresponding to polarization rotated beam 205 is an e-ray with respect to wedge 225. These two components of beam 240 are separated at the surface of wedge 225 which faces the Faraday rotator. Reflected beam 260 is the component corresponding to polarization rotated beam 210 (dotted line), while reflected beam 255 is the component corresponding to polarization rotated beam 205 (solid line). Beams 255 and 260 are polarization rotated by 45° clockwise (again viewing the device from the input beam source side), causing reflected beam 255 to be polarized normal to the plane of the paper and reflected beam 260 to be polarized in the plane of the paper. Beam 255 is therefore an e-ray and beam 260 an o-ray with respect to wedge 215. These two beams are deflected toward the normal at the surface of the wedge which faces the Faraday rotator, continue through the wedge, and emerge parallel from the wedge. It will be noted be comparing FIGS. 2a and 2b that the reflected beams 255 and 260 do not interfere with input beams 205 and 210 respectively, meaning not only that the input and reflected beams do not undergo constructive or destructive interference by superposition of waves, but also that there is sufficient separation between their optical paths that, upon exiting the device on the input side, the reflected beams do not impinge upon the input beam sources, e.g. pump lasers. In addition to isolation by spatial separation of the input and reflected beams, an additional level of isolation is realized if polarization maintaining fibers are used to launch the input beams toward the device because the polarization of each input beam is orthogonal to its corresponding reflected feedback beam.

Several embodiments of an IPWDM according to the invention will now be described.

Figure 3:
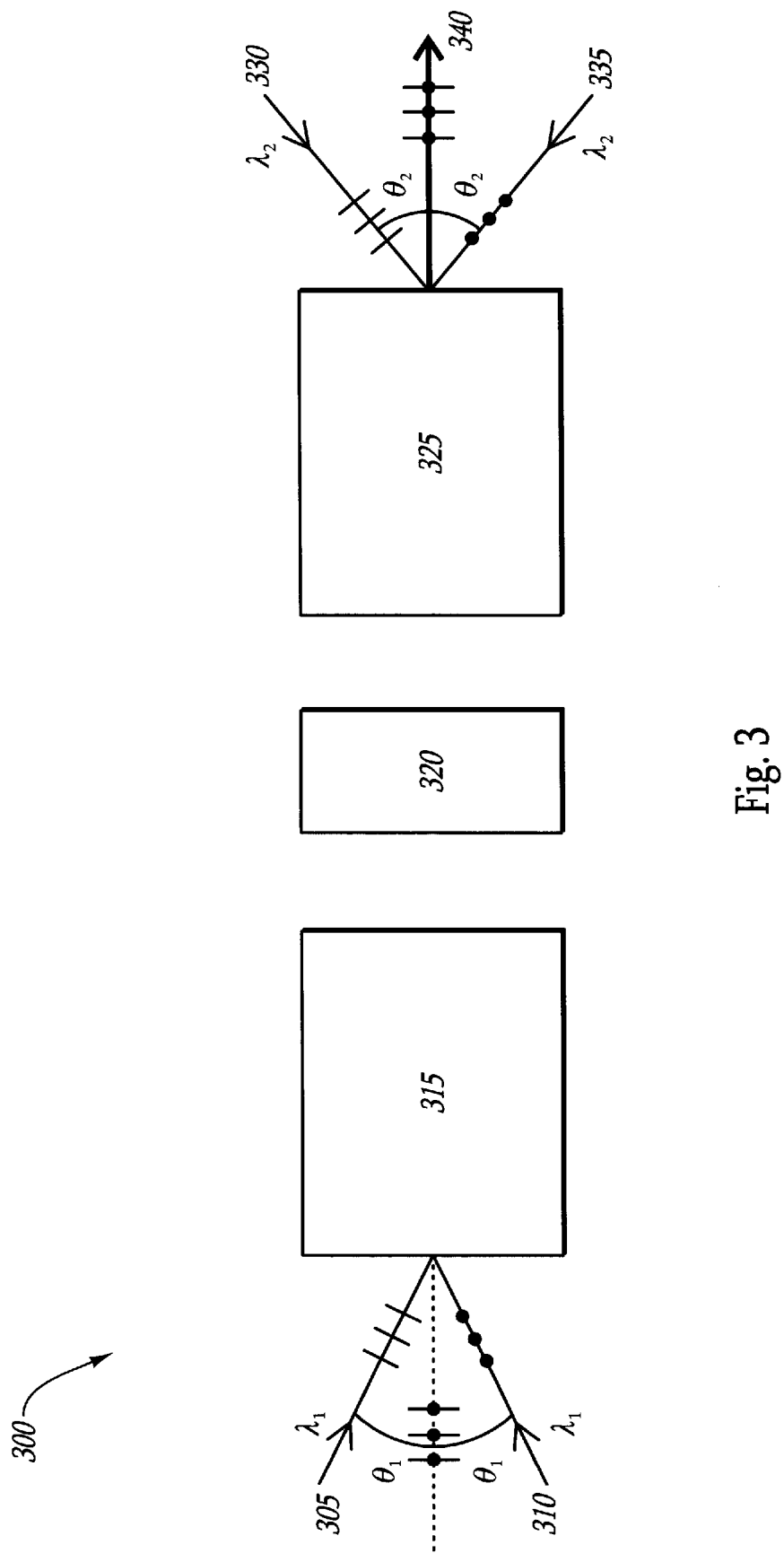
FIG. 3 shows a functional diagram of an embodiment of an integrated polarization combining wavelength division multiplexer (IPWDM).

Shown in FIG. 3 is a functional diagram of an IPWDM 300 including two beam angle turners (BAT) 315, 325 with an intervening wavelength division multiplexer (WDM) 325. First and second input beams 305, 310, both with wavelength $\lambda_1$ but with mutually orthogonal polarizations, are incident on BAT 315 from the left at angle $\pm\theta_1$. Third and fourth input beams 330, 335 both with wavelength $\lambda_2$ but with mutually orthogonal polarizations, are incident on BAT 325 from the right at angle $\pm\theta_2$. Beams 305 and 330 are polarized in the plane of the page, while beams 310 and 330 are polarized in the plane perpendicular to the page. The following convention will be used with respect to embodiments of the IPWDM: The "forward path" through the device for $\lambda_1$ will be from the $\lambda_1$ input (left hand side in the drawing) to the device output (right hand side of drawing) and the "reverse path" will be from the device output toward the $\lambda_1$ input. The "forward path" through the device for $\lambda_2$ will be from the $\lambda_2$ input (right hand side in the drawing) to the device output, and the "reverse path" will be from the device output toward the $\lambda_2$ input.

BAT 315 bends the beams 305, 310 at $\lambda_1$ travelling along the forward path by $\pm\theta_1$, thereby combining them. The direction of bending ($+\theta_1$ or $-\theta_1$) is determined by the polarization of each beam. The WDM 320 is chosen so as to transmit $\lambda_1$, and reflect $\lambda_2$. Polarization combined beams 305 and 310 propagate along the forward path through the rest of the IPWDM without further bending and exit the device along an exit beam path as part of combined exit beam 340. Isolation is realized because any feedback at $\lambda_1$ propagating along the exit beam path and through the IPWDM along the reverse path for $\lambda_1$ will undergo bending by an angle $\pm\theta_2$ in BAT 325, with no further bending in BAT 315, and exit the device at an angle $\pm\theta_2 \neq \pm\theta_1$. BAT 325 bends beams 330, 335 travelling along their forward path by $\pm\theta_2$, thereby combining them. The direction of bending ($+\theta_2$ or $-\theta_2$) is determined by the polarization of each beam. Beams 330 and 335 are then reflected by WDM 320 and continue propagating along their forward path toward the device output, i.e. back through BAT 325, without further bending and are combined with beams 305 and 310, exiting the IPWDM along an exit beam path as polarization combined exit beam 340. Isolation is realized again here: Any feedback at $\lambda_2$ propagating along the exit beam path and through the IPWDM along the reverse path for $\lambda_2$ (device output toward $\lambda_2$ input) will undergo bending by an angle $\pm\theta_2$ in BAT 325 and be reflected by WDM 320 back through BAT 325 with no further bending. However, although this feedback exits BAT 325 at $\pm\theta_2$, the feedback and input beams 330 and 335 are spatially separated. The amount of spatial separation BD between the incident and reflected beams at $\lambda_2$ is related to the spacing d between the center of BAT 325 and WDM 320 and may easily be calculated as:

$$BD = \sin(2\theta_2) * (d/\cos(\theta_2))$$

or approximately (small $\theta_2$):

$$BD \approx 2d\sin(\theta_2).$$

For good isolation, BD should be larger than twice the beam diameter. For a beam diameter of 0.4 mm and incident angle $\theta_2$ of 4° (0.07 radians), the minimum spacing d is approximately 6 mm.

FIG. 4 shows an exemplary implementation of the IPWDM 300 of FIG. 3. FIG. 4a shows a top view of the device, FIG. 4b a side view, and FIG. 4c a front view (from the $\lambda_1$ input side) of the wedge faces. The inputs at $\lambda_1$ are provided through two PM fibers 405, as are the inputs at $\lambda_2$ (PM fibers 455), while the output at $\lambda_1+\lambda_2$ is provided through a single mode (SM) exit fiber 460. A PM fiber may also be used for the exit fiber. Lenses 410 and 450 collimate the input beams at $\lambda_1$ and $\lambda_2$, respectively. BAT 315 and BAT 325 of FIG. 3 are both implemented as IPBCs of the type shown in FIGS. 2a and 2b and described previously. With regard to the orientation of the optic axes of wedges 425 and 435, these should both be oriented at either 45°, as shown in FIG. 4c, or at 135° to the orientation of the optic axis of wedges 415 and 445. The WDM 320 of FIG. 3 is implemented as a thin film band splitter (TF). In one embodiment, the beam angle turners and WDM are integrated into a single module. In another embodiment, the beam angle turners, WDM, collimating lenses, and input and exit fiber terminations are integrated into a single module. Exemplary birefringent wedge materials include $YVO_4$, Rutile, Calcite, $LiNbO_3$, and any other birefringent crystal. The TF may be formed by applying a stack of dielectric thin film coating of suitable thickness and index of refraction to optical glass. As mentioned previously, the TF is chosen so as to transmit $\lambda_1$ while reflecting $\lambda_2$. In this implementation, the Faraday rotator is chosen so as to rotate the polarization of $\lambda_1$ and $\lambda_2$ by 45° clockwise (viewed from the $\lambda_1$ input side, whether the beam is propagating along its forward or reverse path).

Figure 4D:
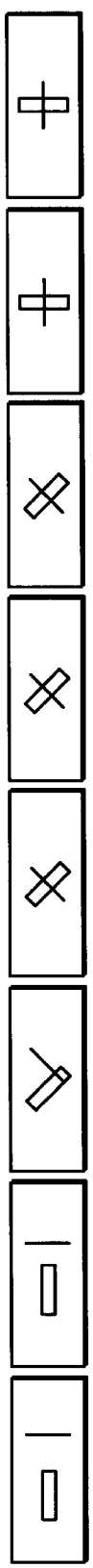
FIGS. 4d, 4e, 4f, and 4g are schematic polarization diagrams corresponding to the IPWDM of FIGS. 4a–4c.
Figure 4E:
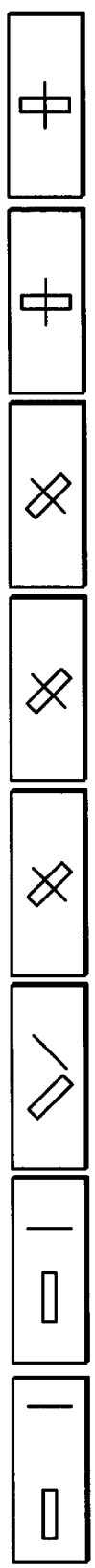
Figure 4F:
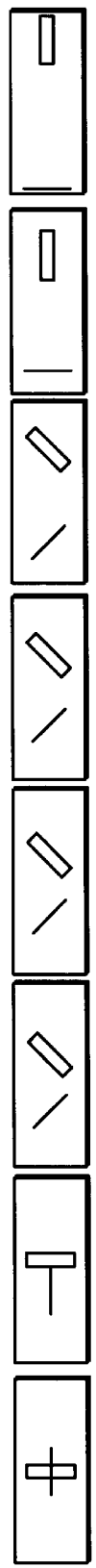
Figure 4G:
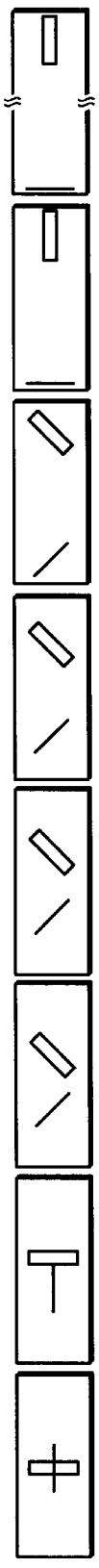

FIGS. 4d through 4g are schematic polarization diagrams showing, at points corresponding to the numbered areas (461-468, 465R-468R) between components of the IPWDM in FIG. 4b: the polarization of the input beams at $\lambda_1$ along the forward path, i.e. $\lambda_1$ input to device output (FIG. 4d); the polarization of the input beams at $\lambda_2$ along the forward path, i.e. $\lambda_2$ input to device output (FIG. 4e); the polarization of the reflected feedback beams at $\lambda_1$ along the reverse path, i.e. device output to $\lambda_1$ input (FIG. 4f); and the polarization of the reflected feedback beams at $\lambda_2$ along the reverse path, i.e. device output to $\lambda_2$ input (FIG. 4g). FIG. 4d (forward path, $\lambda_1$) shows that the two beams at $\lambda_1$ are combined by wedges 415 and 425 (positions 462–464), rotated clockwise 45° by Faraday rotator 420 (position 463), and rotated an additional clockwise 45° by Faraday rotator 440 (position 467). FIG. 4e (forward path, $\lambda_2$) shows that the two beams at $\lambda_2$ are combined by wedges 445 and 435 (positions 467–465), polarization rotated clockwise 45° by Faraday rotator 440 (position 466), reflected by TF 430 with no change in polarization (position 465R) and polarization rotated an additional clockwise 45° by Faraday rotator 440 (position 467R). FIG. 4f (reverse path, reflected feedback at $\lambda_1$) shows that any feedback at $\lambda_1$ is separated according to polarization by wedges 445 and 435 (positions 467–465), polarization rotated clockwise 45° by Faraday rotator 440 (position 466), and polarization rotated an additional clockwise 45° by Faraday rotator 420 (position 462). FIG. 4g (reverse path, reflected feedback at $\lambda_2$) shows that any feedback at $\lambda_2$ is separated according to polarization by wedges 445 and 435 (position 467–465), polarization rotated clockwise 45° by Faraday rotator 440 (position 466), reflected by TF 430 with no change in polarization (position 465R), polarization rotated an additional clockwise 45° by Faraday rotator 440 (position 467R), and further spatially separated at position 468R with respect to position 467R.

A comparison of FIGS. 4a and 2b reveals that the forward path for both $\lambda_1$ and $\lambda_2$ through wedge 435, Faraday rotator 440, and wedge 445 is very similar to the reverse path through the IPBC shown in FIG. 2b. As will be apparent to those skilled in the art, the single combined beam shown in FIGS. 4d and 4e and described above in connection with FIG. 3 comprises in actuality two parallel, collimated beams with a negligibly small separation. These two beams are incident upon the termination of exit fiber 460. For collimated beams, coupling loss between fibers is not sensitive to beam separation, being much more sensitive to beam propagation angle. In addition, since the separation between the wedges is very small, typically<1 mm, the resulting beam separation is also very small. In the case of an exemplary embodiment employing $YVO_4$ wedges having a wedge angle of 9.4°, the beam separation is less than 32 $\mu$m. Such a small beam separation, compared to a typical beam spot size of 400 $\mu$m, introduces minimal insertion loss.

As will be apparent to those skilled in the art, isolation from feedback along the reverse path for $\lambda_1$ is very high, since in addition to exiting (at the input side of the device) at $\pm\theta_2$ (whereas $\lambda_1$ is input at $\pm\theta_1$), the beams are polarized differently due to the presence of the two Faraday rotators 420 and 440, forming in effect a two stage isolator for $\lambda_1$. As mentioned previously, however, isolation for $\lambda_2$ is dependent on the spacing between the TF and the center of the wedge 3/rotator 2/wedge 4 combination. The spacing requirement may be calculated using the equations developed above.

The amount of beam bending provided by each wedge depends on wedge angle. The separation angle $\Theta_1$ between the two input beams at $\lambda_1$ may be calculated as follows: If the wedge angle for wedges 415 and 425 is $\alpha$, then the separation angle is given approximately by:

$$\Theta_1 \approx 2(n_e - n_o)\alpha$$

where $(n_e - n_o)$ represents the difference in index of refraction along different axes of the birefringent crystal, $n_e$ being the index of refraction along the crystal or optic axis and $n_o$ being the index of refraction in a direction normal to the optic axis. As is readily apparent, in FIGS. 3 and 4, $\theta_1 = \Theta_1/2$. Similarly, if $\beta$ is the wedge angle of wedges 435 and 445, then the separation angle $\Theta_2$ between the input beams at $\lambda_2$ is approximately:

$$\Theta_2 \approx 2(n_e - n_o)\beta$$

and $\theta_2 \approx \Theta_2/2$. Optimal isolation will occur for separation angles $\Theta_2$ larger than $\Theta_1$. In one embodiment, $\beta = 2\alpha$. As mentioned previously, a typical beam diameter may be 0.4 mm. In such a case, if $YVO_4$ birefringent wedges are used $(n_e - n_o = 0.213)$, for a wedge angle of about 9.5° and a separation between the terminations of the $\lambda_2$ input PM fibers 455 and lens 450 of 0.125 mm, lens 450 should have a focal length of about 1.8 mm.

As shown previously for the IPBC, the input and reflected feedback optical beams propagate through the IPWDM without interfering with each other, meaning not only that the input and reflected beams do not undergo constructive or destructive interference by superposition of waves, but also that there is sufficient separation between their optical paths that, upon exiting the device, the reflected beams cannot enter the PM fibers from which the input beams are launched. The sources of the input beams, e.g. pump lasers, are thereby isolated from feedback reflected from the device.

Figure 5A:
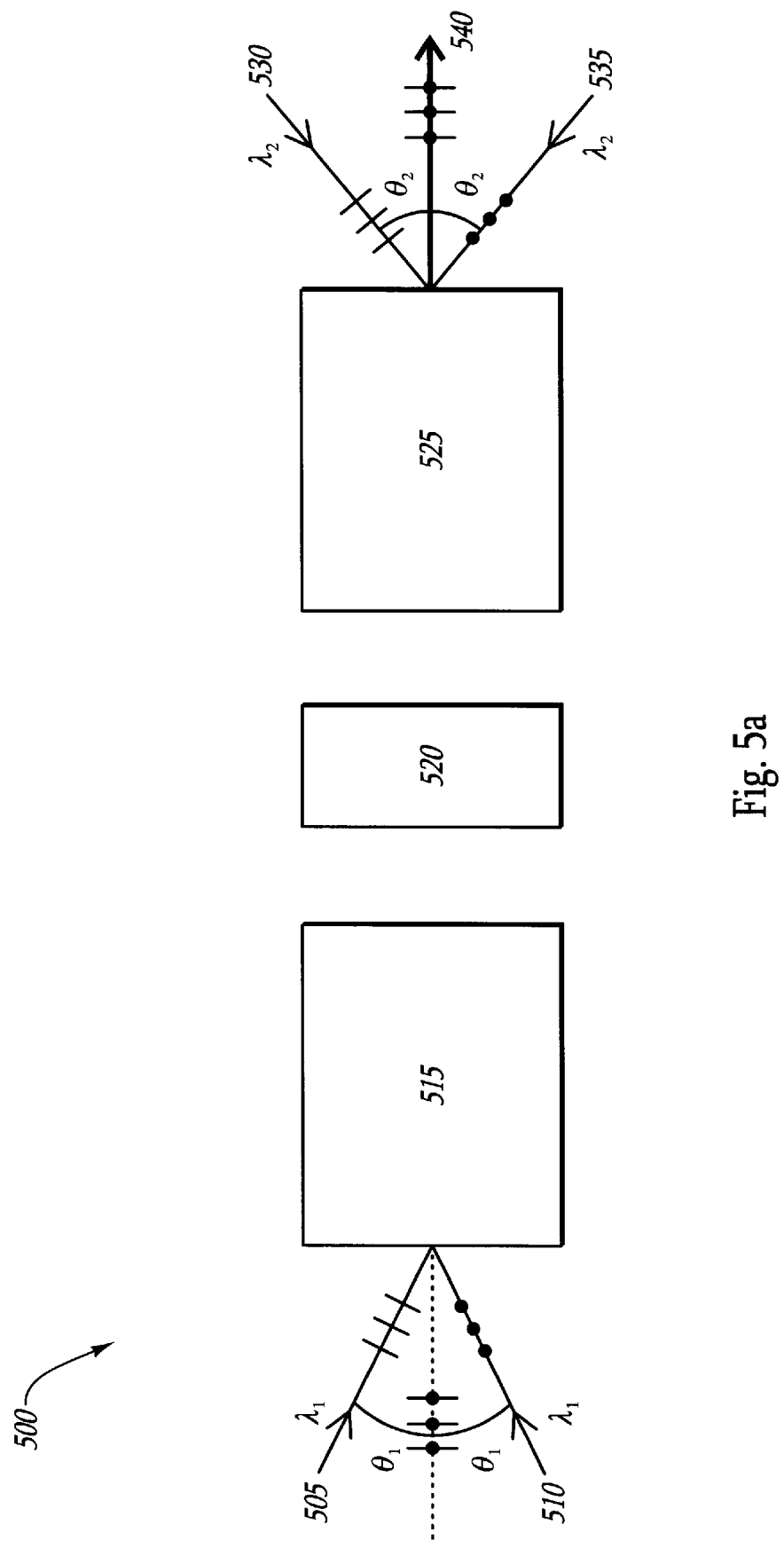
FIG. 5a shows a functional diagram of another embodiment of an IPWDM.

FIG. 5a shows a functional diagram of another embodiment of an IPWDM 500 according to the invention. This embodiment is different from that shown in FIG. 3 in that the first BAT 515 bends a beam by $\pm\theta_1$, depending on its polarization, regardless of whether the beam is travelling along the forward path or the reverse path. BAT 525 is the same as in FIG. 3.

Figure 5B:
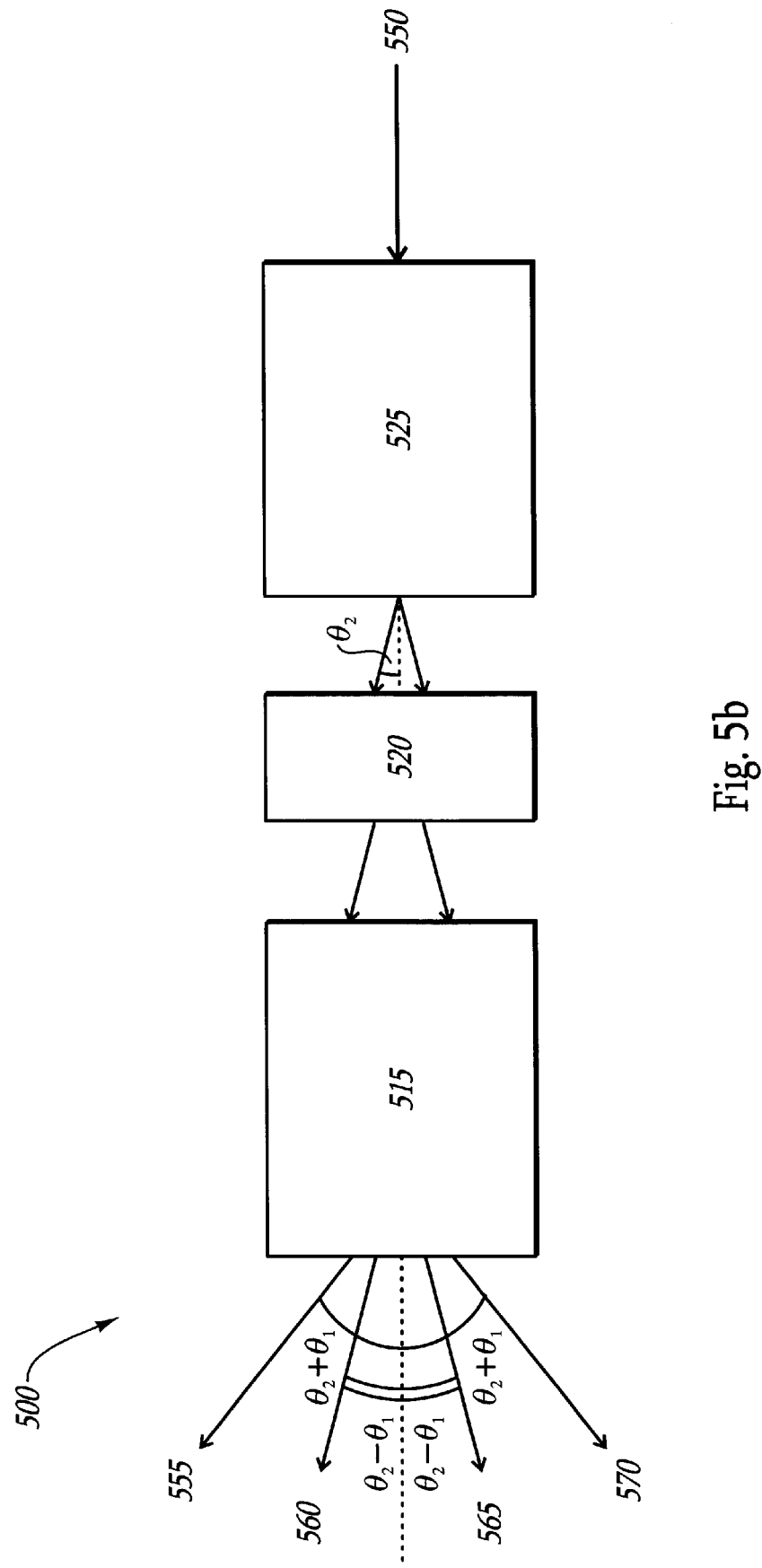

FIG. 5b schematically shows the reverse path for feedback at $\lambda_1$. Reflected light beam 550 having wavelength $\lambda_1$ propagating back through the IPWDM (reverse path, device output to $\lambda_1$ input) is bent by $\pm\theta_2$ (depending on polarization) by BAT 525, thereby separating the beams of different polarization. The separated beams then pass through the WDM 520 without further bending, but then each beam undergoes bending by $\pm\theta_1$ (depending on polarization) in BAT 515, resulting in four beams 555, 560, 565, 570 at angles $\pm(\theta_2+\theta_1)$ and $\pm(\theta_2-\theta_1)$, as will be explained in greater detail below in connection with FIG. 6a–6g. Isolation along the $\lambda_1$ reverse path is thereby realized because none of the feedback beams is oriented at $\pm\theta_1$ ($\lambda_1$ input beam orientation).

Figure 6D:
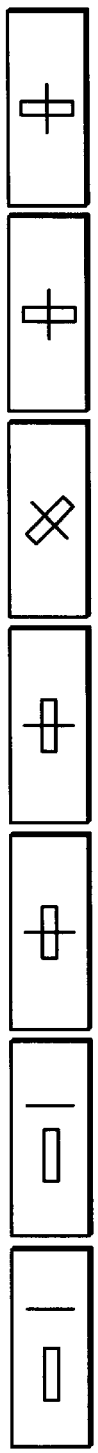
FIGS. 6d, 6e, 6f, and 6g are schematic polarization diagrams corresponding to the IPWDM of FIGS. 6a–6c.
Figure 6E:
Figure 6F:
Figure 6G:
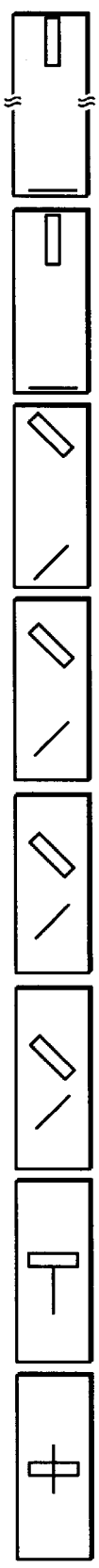

FIGS. 6a, 6b, and 6c show an implementation of the IPWDM shown in FIGS. 5a and 5b. Attention is called to the absence of a Faraday rotator between wedges 615 and 625. Reference is made to FIGS. 4a, 4b, and 4c for a description of the various components and symbols. In one embodiment, the beam angle turners and WDM are integrated into a single module. In another embodiment, the beam angle turners, WDM, collimating lenses, and input and exit fiber terminations are integrated into a single module. The orientation of the optic axes of the wedges is shown in FIG. 6c. The optic axes of wedge 435 may also be oriented at 135° to the optic axis of wedges 615 and 645. FIGS. 6d, 6e, 6f, and 6g show schematic polarization diagrams which are analogous to FIGS. 4d–4g. FIG. 6d shows the polarization for the input beams of wavelength $\lambda_1$ travelling along the forward path. FIG. 6e shows the polarization for the input beams of wavelength $\lambda_2$ travelling along the forward path. FIG. 6f shows the polarization for reflected feedback beams of wavelength $\lambda_1$ travelling along the reverse path (device output to $\lambda_1$ input). FIG. 6g shows the polarization for feedback at $\lambda_2$ travelling along the reverse path (device output to $\lambda_2$ input). As noted above in connection with the previously described embodiment, the input and reflected feedback optical beams propagate through the device without interfering with each other.

With the aid of FIG. 6f, the separation of the feedback beam 550 shown in FIG. 5b into four separate feedback beams may now be explained, in the context of the specific embodiment shown in FIGS. 6a–6c. It will be noted that neither of the two beams which exit wedge 635 and pass through WDM 630 are polarized parallel or normal to the optic axis of wedge 625. (See positions 664 and 663.)

Therefore, wedge 625 separates each beam into two components, one parallel to the optic axis, the other normal to the optic axis, resulting in four beams, two parallel to the optic axis and two normal to the optic axis. (Note that this process also accounts for the apparent polarization rotation at position 665 in FIG. 6d.) The components parallel and normal to the optic axis see different indices of refraction, as described previously. The four beams undergo bending by $\pm\theta_1$ according to their polarization, which added to the previous bending by $\pm\theta_2$, results in the four beams at $\pm(\theta_2+\theta_1)$ and $\pm(\theta_2-\theta_1)$ shown in FIG. 5b.

As will be evident to those skilled in the art, the invention promises numerous advantages over the prior art. Each of the embodiments described previously may advantageously be integrated into a single integrated module, for example a single tube. Such embodiments integrate the required components into a single integrated module, providing polarization beam combining, wavelength multiplexing, and isolation with reduced size, improved performance, improved reliability, and reduced cost. An example of the reduction in size which may be achieved using the principles of the invention is as follows: A device according to the invention may be made to the size of a 60 mm by 5.5 mm diameter tube. By contrast, a combination of discrete components according to prior art methods typically requires two PBCs (33 mm by 5.5 mm diameter each), one WDM (33 mm by 5.5 mm diameter), and at least one isolator (33 mm by 5.5 mm diameter). Since these discrete components will be connected through fibers with a minimum fiber band radius, e.g. 50 mm for SMF-28 fibers, a module comprising these discrete components would have the dimensions 75 mm×125 mm×15 mm, with a volume approximately a hundred times larger than an integrated device according to the invention. Improved performance is realized because only two collimating lenses are needed. Loss associated with the minimum two additional collimators (four total) used in prior art systems is therefore avoided. Moreover, since an integrated device according to the invention uses fewer discrete components, additional insertion loss improvement can be realized. If loss per collimator is assumed to be 0.2 dB, fewer parts decreases insertion loss by an additional 0.2 dB, for a total loss improvement of 2×0.2 dB+0.2 dB=0.6 dB. Fewer discrete components improves reliability and complexity. An integrated module according to the invention has the same lifetime as each individual component (wedge, TF, Faraday rotator) in the module, while in prior art systems, lifetime is limited to the lifetime of the component with the shortest lifetime. As an added advantage, the system and method of the invention permit relatively small separation angles at incidence $\Theta_1$ and $\Theta_2$ in comparison to prior art systems, which typically require separation angles close to 90°.

As will also be evident to those skilled in the art, in the embodiments described in FIGS. 5 and 6, optimal isolation will occur for separation angles $\Theta_2$ larger than $\Theta_1$.

As described previously, these separation angles are related to the wedge angles $\alpha$ and $\beta$. In one embodiment, $\beta=2\alpha$.

Figure 8C:
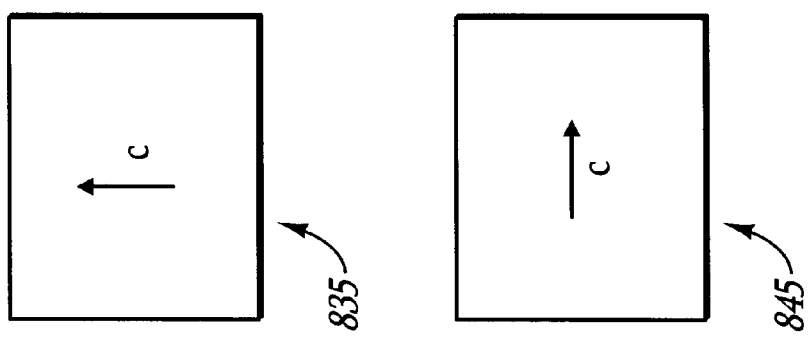
Figure 8D:
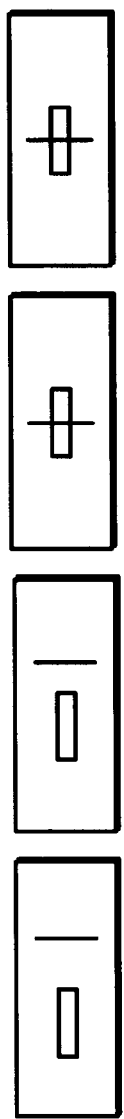
FIGS. 8d and 8e are schematic polarization diagrams corresponding to the IPWDM of FIGS. 8a–8c.
Figure 8E:
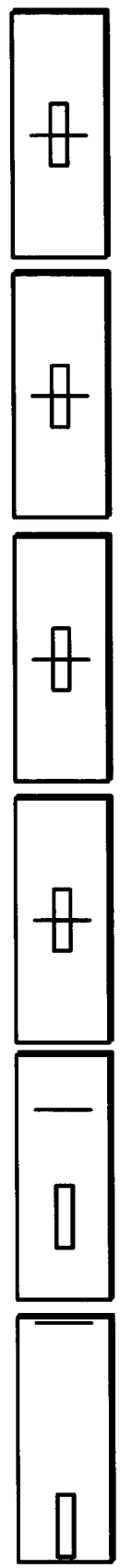

FIGS. 7 and 8 show another embodiment of an IPWDM which may be used in applications where isolation is not required, as in the case of an EDFA module, where most 1480 nm pump lasers have internal isolation built in. This embodiment accomplishes polarization and multiplexing with a single, integrated module. FIG. 7 shows a functional diagram of the embodiment, which includes a WDM 720 and a BAT 725. Reference is made to FIG. 3 for a description of the various symbols. In this case, the input beams 730, 735 at $\lambda_2$ are separated by twice the separation angle of the beams 705, 710 at $\lambda_1$ in order to achieve the polarization combined output beam 740 at $\lambda_1+\lambda_2$. FIGS. 8a–8c show an implementation of this embodiment in a manner analogous to FIGS. 4a–4c and 6a–6c. Attention is called to the absence of a Faraday rotator in BAT 725. The orientation of the optic axes of the wedges is shown in FIG. 8c. FIG. 8d shows a polarization diagram for $\lambda_1$, forward path. FIG. 8e shows a polarization diagram for $\lambda_2$, forward path. In another embodiment, the devices shown in FIGS. 7 and 8 may be integrated into a single integrated module, as described previously, providing polarization beam combing/splitting and wavelength division multiplexing in a single device.

It is to be understood that the beam bending angles shown in all figures herein have been exaggerated for clarity, and further, that the symmetric arrangement of input beams at $\lambda_1$ and $\lambda_2$ about a wedge surface normal is only one example of many possible arrangements for the input sources. It will be understood, however, that the relative separation between beams will obey the relationships developed herein.

Various embodiments of the present invention have now been described. While these embodiments have been set forth by way of example, various other embodiments and modifications will be apparent to those skilled in the art. Accordingly, it should be understood that the invention is not limited to such embodiments.

What is claimed is:

1. A device for combining optical beams comprising:
   a first beam angle turner which includes a first birefringent wedge with a first optic axis oriented in a first direction and a second birefringent wedge with a second optic axis oriented in a second direction different from the first direction;
   a second beam angle turner which includes a third birefringent wedge with a third optic axis oriented in a third direction, a fourth birefringent wedge with a fourth optic axis oriented in a fourth direction different from the third direction, and a Faraday rotator disposed between the third and fourth wedges; and
   a wavelength division multiplexer (WDM) that is disposed between the first and second beam angle turners and that transmits light of a first wavelength and that reflects light of a second wavelength, said WDM having a first surface facing the second wedge opposite the first wedge and a second surface facing the fourth wedge opposite the Faraday rotator.

2. The device according to claim 1:
   wherein the first direction forms an angle of 90° with the second direction; and
   wherein the third direction forms an angle of 45° with the fourth direction.

3. The device according to claim 1:
   wherein the first direction forms an angle of 90° with the second direction; and
   wherein the third direction forms an angle of 135° with the fourth direction.

4. The device according to claim 1, wherein:
   first and second linearly polarized optical beams incident upon the first wedge opposite the second wedge are combined into a first polarization combined beam by the first beam angle turner and transmitted by the WDM;
   third and fourth linearly polarized optical beams incident upon the third wedge opposite the Faraday rotator are polarization rotated and combined into a second polarization combined beam by the second beam angle turner and reflected by the WDM; and the first and second polarization combined beams are combined into an exit beam, said exit beam exiting the device along an exit beam path through the second beam angle turner;

the first and second optical beams have the first wavelength and mutually orthogonal polarizations; and the third and fourth optical beams have the second wavelength and mutually orthogonal polarizations;

whereby reflected light reflected back along the exit beam path is isolated from the first, second, third, and fourth optical beams.

5. The device according to claim 4, further comprising:

first and second polarization maintaining (PM) fiber terminations facing the first wedge;

third and fourth PM fiber terminations facing the third wedge;

an exit beam optical fiber termination facing the third wedge disposed between the third and fourth PM fiber terminations;

a first collimating lens disposed between the first wedge and the first and second PM fiber terminations; and a second collimating lens disposed between the third wedge and the third and fourth PM fiber terminations and the exit beam optical fiber termination;

wherein the first and second optical beams are launched respectively from the first and second PM fiber terminations toward the first wedge;

wherein the third and fourth optical beams are launched respectively from the third and fourth PM fiber terminations toward the third wedge; and wherein the exit beam is received at the exit beam optical fiber termination.

6. The device according to claim 5, wherein the first and second beam angle turners, WDM, first and second collimating lenses, first, second, third, and fourth PM fiber terminations, and the exit beam optical fiber termination are integrated into a single module.

7. The device according to claim 1, wherein the first, second, third, and fourth wedges are composed of $YVO_4$, Rutile, Calcite, $LiNbO_3$, or any other birefringent crystal.

8. A method of combining optical beams comprising:

providing a first beam angle turner which includes a first birefringent wedge with a first optic axis oriented in a first direction and a second birefringent wedge with a second optic axis oriented in a second direction different from the first direction;

providing a second beam angle turner which includes a third birefringent wedge with a third optic axis oriented in a third direction, a fourth birefringent wedge with a fourth optic axis oriented in a fourth direction different from the third direction, and a Faraday rotator disposed between the third and fourth wedges;

providing a wavelength division multiplexer (WDM) that is disposed between the first and second beam angle turners and that transmits light of a first wavelength and that reflects light of a second wavelength, said WDM having a first surface facing the second wedge opposite the first wedge and a second surface facing the fourth wedge opposite the Faraday rotator;

receiving and combining in the first beam angle turner first and second linearly polarized optical beams having the first wavelength and mutually orthogonal polarizations to form a first polarization combined beam;

receiving, polarization rotating, and combining in the second beam angle turner third and fourth linearly polarized optical beams having the second wavelength and mutually orthogonal polarizations to form a second polarization combined beam;

transmitting the first and second optical beams through the WDM and reflecting the third and fourth optical beams from the second surface of the WDM; and combining the first and second polarization combined beams into an exit beam, said exit beam propagating along an exit beam path through the second beam angle turner; and whereby reflected light reflected back along the exit beam path is isolated from the first, second, third, and fourth optical beams.

9. The method according to claim 8:

wherein the first direction forms an angle of 90° with the second direction; and wherein the third direction forms an angle of 45° with the fourth direction.

10. The method according to claim 8:

wherein the first direction forms an angle of 90° with the second direction; and wherein the third direction forms an angle of 135° with the fourth direction.

11. The method according to claim 8, further comprising:

providing first and second polarization maintaining (PM) fiber terminations facing the first wedge and a first collimating lens disposed between the first and second PM fiber terminations and the first wedge;

providing third and fourth PM fiber terminations and an exit beam optical fiber termination facing the third wedge and a second collimating lens disposed between the third wedge and the third and fourth PM fiber terminations and the exit beam optical fiber termination, the exit beam optical fiber termination being disposed between the third and fourth PM fiber terminations;

launching the first and second optical beams from the first and second PM fiber terminations, respectively, through the first collimating lens toward the first wedge;

launching the third and fourth optical beams from the third and fourth PM fiber terminations, respectively, through the second collimating lens toward the third wedge; and receiving the exit beam at the exit beam optical fiber termination.

12. The method according to claim 11, wherein the first and second beam angle turners, WDM, first and second collimating lenses, first, second, third, and fourth PM fiber terminations, and the exit beam optical fiber termination are integrated into a single module.

13. The method according to claim 11, wherein the first, second, third, and fourth wedges are composed of $YVO_4$, Rutile, Calcite, $LiNbO_3$, or any other birefringent crystal.

14. A device for combining optical beams comprising:

a beam angle turner which includes a first birefringent wedge with a first optic axis oriented in a first direction and a second birefringent wedge with a second optic axis oriented in a second direction different from the first direction;

a wavelength division multiplexer (WDM) that transmits light of a first wavelength and that reflects light of a second wavelength, the WDM having a first surface facing the first wedge opposite the second wedge;

first and second polarization maintaining (PM) fiber terminations facing a second surface of the WDM opposite the first surface;

a first collimating lens disposed between the second surface of the WDM and the first and second PM fiber terminations;

third and fourth PM fiber terminations facing the second wedge opposite the first wedge;

an exit beam optical fiber termination disposed between the third and fourth PM fiber terminations and facing the second wedge opposite the first wedge; and a second collimating lens disposed between the second wedge and the third and fourth PM fiber terminations and the exit beam optical fiber termination;

wherein the first direction forms an angle of 90° with the second direction; and wherein the beam angle turner, WDM, first and second collimating lenses, first, second, third, and fourth PM fiber terminations, and the exit beam optical fiber termination are integrated into a single module.

15. The device according to claim 14, wherein:

first and second linearly polarized optical beams launched from the first and second PM fibers, respectively, collimated by the first collimating lens, and incident upon the second surface of the WDM with a first separation angle Θ are transmitted by the WDM;

third and fourth linearly polarized optical beams launched from the third and fourth PM fibers, respectively, collimated by the second collimating lens, and incident upon the second wedge opposite the first wedge with a separation angle 2Θ at incidence are deflected by the beam angle turner, incident upon the first surface of the WDM with a second separation angle Θ, and reflected by the WDM;

the first and second transmitted optical beams and the third and fourth reflected optical beams are combined into a polarization combined exit beam by the beam angle turner, said exit beam exiting the device along an exit beam path through the beam angle turner;

the exit beam is received at the exit beam optical fiber termination;

the first and second optical beams have the first wavelength and mutually orthogonal polarizations;

the third and fourth optical beams have the second wavelength and mutually orthogonal polarizations.

16. The device according to claim 14, wherein the first and second wedges are composed of YVO$_4$, Rutile, Calcite, LiNbO$_3$, or any other birefringent crystal.

17. A method of combining optical beams comprising:

providing a beam angle turner which includes a first birefringent wedge with a first optic axis oriented in a first direction and a second birefringent wedge with a second optic axis oriented in a second direction different from the first direction;

providing a wavelength division multiplexer (WDM) that transmits light of a first wavelength and that reflects light of a second wavelength, the WDM having a first surface facing the first wedge opposite the second wedge;

providing first and second polarization maintaining (PM) fiber terminations facing a second surface of the WDM opposite the first surface;

providing a first collimating lens disposed between the second surface of the WDM and the first and second PM fiber terminations;

providing third and fourth PM fiber terminations facing the second wedge opposite the first wedge;

providing an exit beam optical fiber termination disposed between the third and fourth PM fiber terminations and facing the second wedge opposite the first wedge;

providing a second collimating lens disposed between the second wedge and the third and fourth PM fiber terminations and the exit beam optical fiber termination;

launching first and second linearly polarized optical beams having the first wavelength and mutually orthogonal polarizations from the first and second PM fiber terminations, respectively, through the first collimating lens toward the second surface of the WDM with a first separation angle Θ at incidence upon the second surface;

transmitting the first and second optical beams through the WDM;

launching third and fourth linearly polarized optical beams having the second wavelength and mutually orthogonal polarizations from the third and fourth PM fiber terminations, respectively, through the second collimating lens toward the second wedge with a separation angle 2Θ at incidence upon the second wedge;

deflecting the third and fourth optical beams in the beam angle turner such that the third and fourth optical beams are incident upon the first surface of the WDM with a second separation angle Θ at incidence;

reflecting the third and fourth optical beams from the first surface;

combining the transmitted first and second optical beams and the reflected third and fourth optical beams to form a polarization combined exit beam, said exit beam propagating along an exit beam path through the beam angle turner; and receiving the exit beam at the exit beam optical fiber termination;

wherein the first direction forms an angle of 90° with the second direction; and wherein the beam angle turner, WDM, first and second collimating lenses, first, second, third, and fourth PM fiber terminations, and the exit beam optical fiber termination are integrated into a single module.

18. The method according to claim 17, wherein the first and second wedges are composed of YVO$_4$, Rutile, Calcite, LiNbO$_3$, or any other birefringent crystal.

19. A device for combining optical beams comprising:

a first beam angle turner which includes a first birefringent wedge with a first optic axis oriented in a first direction, a second birefringent wedge with a second optic axis oriented in a second direction different from the first direction, and a first Faraday rotator disposed between the first and second wedges;

a second beam angle turner which includes a third birefringent wedge with a third optic axis oriented in a third direction, a fourth birefringent wedge with a fourth optic axis oriented in a fourth direction different from the third direction, and a second Faraday rotator disposed between the third and fourth wedges; and a wavelength division multiplexer (WDM) that is disposed between the first and second beam angle turners and that transmits light of a first wavelength and that reflects light of a second wavelength, said WDM having a first surface facing the second wedge opposite the first Faraday rotator and a second surface facing the fourth wedge opposite the second Faraday rotator.

20. The device according to claim 19:

wherein the first optic axis forms an angle of 45° with the second optic axis; and wherein the third optic axis forms an angle of 45° with the fourth optic axis.

21. The device according to claim 19:
wherein the first optic axis forms an angle of 135° with the second optic axis; and
wherein the third optic axis forms an angle of 135° with the fourth optic axis.

22. The device according to claim 19, wherein:
first and second linearly polarized optical beams incident upon the first wedge opposite the first Faraday rotator are polarization rotated and combined into a first polarization combined beam by the first beam angle turner and transmitted by the WDM;
third and fourth linearly polarized optical beams incident upon the third wedge opposite the second Faraday rotator are polarization rotated and combined into a second polarization combined beam by the second beam angle turner and reflected by the WDM; and
the first and second polarization combined beams are combined into an exit beam, said exit beam exiting the device along an exit beam path through the second beam angle turner;
the first and second optical beams have the first wavelength and mutually orthogonal polarizations; and
the third and fourth optical beams have the second wavelength and mutually orthogonal polarizations;
whereby reflected light reflected back along the exit beam path is isolated from the first, second, third, and fourth optical beams.

23. The device according to claim 22, further comprising:
first and second polarization maintaining (PM) fiber terminations facing the first wedge;
third and fourth PM fiber terminations facing the third wedge;
an exit beam optical fiber termination facing the third wedge disposed between the third and fourth PM fiber terminations;
a first collimating lens disposed between the first wedge and the first and second PM fiber terminations; and
a second collimating lens disposed between the third wedge and the third and fourth PM fiber terminations and the exit beam optical fiber termination;
wherein the first and second optical beams are launched respectively from the first and second PM fiber terminations toward the first wedge;
wherein the third and fourth optical beams are launched respectively from the third and fourth PM fiber terminations toward the third wedge; and
wherein the exit beam is received at the exit beam optical fiber termination.

24. The device according to claim 23, wherein the first and second beam angle turners, WDM, first and second collimating lenses, first, second, third, and fourth PM fiber terminations, and the exit beam optical fiber termination are integrated into a single module.

25. The device according to claim 19, wherein the first, second, third, and fourth wedges are composed of $YVO_4$, Rutile, Calcite, $LiNbO_3$, or any other birefringent crystal.

26. A method of combining optical beams comprising:
providing a first beam angle turner which includes a first birefringent wedge with a first optic axis oriented in a first direction, a second birefringent wedge with a second optic axis oriented in a second direction different from the first direction, and a first Faraday rotator disposed between the first and second wedges;
providing a second beam angle turner which includes a third birefringent wedge with a third optic axis oriented in a third direction, a fourth birefringent wedge with a fourth optic axis oriented in a fourth direction different from the third direction, and a second Faraday rotator disposed between the third and fourth wedges;
providing a wavelength division multiplexer (WDM) that is disposed between the first and second beam angle turners and that transmits light of a first wavelength and that reflects light of a second wavelength, said WDM having a first surface facing the second wedge opposite the first Faraday rotator and a second surface facing the fourth wedge opposite the second Faraday rotator;
receiving, polarization rotating, and combining in the first beam angle turner first and second linearly polarized optical beams having the first wavelength and mutually orthogonal polarizations to form a first polarization combined beam;
receiving, polarization rotating, and combining in the second beam angle turner third and fourth linearly polarized optical beams having the second wavelength and mutually orthogonal polarizations to form a second polarization combined beam;
transmitting the first and second optical beams through the WDM and reflecting the third and fourth optical beams from the second surface of the WDM; and
combining the first and second polarization combined beams into an exit beam, said exit beam propagating along an exit beam path through the second beam angle turner; and
whereby reflected light reflected back along the exit beam path is isolated from the first, second, third, and fourth optical beams.

27. The method according to claim 26:
wherein the first direction forms an angle of 45° with the second direction; and
wherein the third direction forms an angle of 45° with the fourth direction.

28. The method according to claim 26:
wherein the first direction forms an angle of 135° with the second direction; and
wherein the third direction forms an angle of 135° with the fourth direction.

29. The method according to claim 26, further comprising:
providing first and second polarization maintaining (PM) fiber terminations facing the first wedge and a first collimating lens disposed between the first and second PM fiber terminations and the first wedge;
providing third and fourth PM fiber terminations and an exit beam optical fiber termination facing the third wedge and a second collimating lens disposed between the third wedge and the third and fourth PM fiber terminations and the exit beam optical fiber termination, the exit beam optical fiber termination being disposed between the third and fourth PM fiber terminations;
launching the first and second optical beams from the first and second PM fiber terminations, respectively, through the first collimating lens toward the first wedge;
launching the third and fourth optical beams from the third and fourth PM fiber terminations, respectively, through the second collimating lens toward the third wedge; and receiving the exit beam at the exit beam optical fiber termination.

30. The method according to claim 29, wherein the first and second beam angle turners, WDM, first and second collimating lenses, first, second, third, and fourth PM fiber terminations, and the exit beam optical fiber termination are integrated into a single module.

31. The method according to claim 26 wherein the first, second, third, and fourth wedges are composed of $YVO_4$, Rutile, Calcite, $LiNbO_3$, or any other birefringent crystal.

32. A device for combining optical beams comprising:

a first beam angle turner which includes first and second birefringent wedges and a first Faraday rotator disposed between the first and second wedges;

a second beam angle turner which includes third and fourth birefringent wedges and a second Faraday rotator disposed between the third and fourth wedges;

a wavelength division multiplexer (WDM) that is disposed between the first and second beam angle turners and that transmits light of a first wavelength and that reflects light of a second wavelength;

wherein the first and second wedges and the first Faraday rotator are disposed in relation to each other and contoured such that first and second optical beams of the first wavelength incident on the first wedge at a first prescribed separation angle are combined into a first combined exit beam at the first wavelength that exits the second wedge opposite the first Faraday rotator;

wherein the third and fourth wedges and the second Faraday rotator are disposed in relation to each other and contoured such that third and fourth optical beams of the second wavelength incident on the third wedge at a second prescribed separation angle are combined into a second combined exit beam that exits the fourth wedge opposite the second Faraday rotator;

wherein the first beam angle turner, the second beam angle turner and the WDM are disposed in relation to each other such that that the first combined exit beam that exits the second wedge passes through the WDM and is incident upon the fourth wedge opposite the second Faraday rotator and such that the second combined exit beam that exits the fourth wedge is reflected by the WDM and is incident upon the fourth wedge opposite the second Faraday rotator;

wherein the third and fourth wedges, the second Faraday rotator and the WDM are further disposed in relation to each other and contoured such that, the first combined exit beam passes through the second beam angle turner and exits the third wedge and follows an exit beam path intersecting the third wedge opposite the second Faraday rotator, the second combined exit beam passes back through the second beam angle turner and exits the third wedge opposite the second Faraday rotator and joins the exit beam path, light of the first wavelength reflected back along the exit beam path passes through the second beam angle turner and passes through the WDM, and light of the second wavelength that is reflected back along the exit beam path passes through the second beam angle turner, is reflected from the WDM and passes again back through the second beam angle turner and exits the third wedge without interfering with either the third or fourth incident beams;

wherein the first and second wedges, the first Faraday rotator and the WDM are further disposed in relation to each other and are contoured such that the reflected light of the first wavelength, that is reflected back along the exit beam path through the second beam angle turner and the WDM, passes through the first beam angle turner and exits the first wedge without interfering with either the first or second incident beams;

whereby the first combined exit beam comprising the first and second incident beams of the first wavelength and the second combined exit beam comprising the third and fourth incident beams of the second wavelength are combined into a third combined exit beam that follows the exit beam path and that includes the first and second wavelengths; and whereby reflected light reflected back along the exit beam path is isolated from the first, second, third and fourth incident beams.

33. The device according to claim 32, wherein:

each of the first, second, third, and fourth wedges is contoured so as to have an optic axis with a prescribed orientation;

the optic axis of the first wedge forms an angle of 45° with the optic axis of the second wedge; and the optic axis of the third wedge forms an angle of 45° with the optic axis of the fourth wedge.

34. The device according to claim 32, wherein:

each of the first, second, third, and fourth wedges is contoured so as to have an optic axis with a prescribed orientation;

the optic axis of the first wedge forms an angle of 135° with the optic axis of the second wedge; and the optic axis of the third wedge forms an angle of 135° with the optic axis of the fourth wedge.

35. The device according to claim 32, wherein the first, second, third, and fourth wedges are composed of $YVO_4$, Rutile, Calcite, $LiNbO_3$, or any other birefringent crystal.

36. A method for combining optical beams comprising:

providing a first beam angle turner which includes first and second birefringent wedges and a first Faraday rotator disposed between the first and second wedges;

providing a second beam angle turner which includes third and fourth birefringent wedges and a second Faraday rotator disposed between the third and fourth wedges;

providing a wavelength division multiplexer (WDM) that is disposed between the first and second beam angle turners and that transmits light of a first wavelength and that reflects light of a second wavelength;

receiving and combining into a first combined exit beam first and second optical beams of the first wavelength;

receiving and combining into a second combined exit beam third and fourth optical beams of the second wavelength;

transmitting the first combined exit beam and reflecting the second combined exit beam;

wherein the first and second wedges and the first Faraday rotator are disposed in relation to each other and contoured such that the first and second optical beams incident on the first wedge at a first prescribed separation angle are combined into the first combined exit beam at the first wavelength that exits the second wedge opposite the first Faraday rotator;

wherein the third and fourth wedges and the second Faraday rotator are disposed in relation to each other and contoured such that the third and fourth optical beams incident on the third wedge at a second prescribed separation angle are combined into the second combined exit beam that exits the fourth wedge opposite the second Faraday rotator;

wherein the first beam angle turner, the second beam angle turner and the WDM are disposed in relation to each other such that that the first combined exit beam that exits the second wedge passes through the WDM and is incident upon the fourth wedge opposite the second Faraday rotator and such that the second combined exit beam that exits the fourth wedge is reflected by the WDM and is incident upon the fourth wedge opposite the second Faraday rotator;

wherein the third and fourth wedges, the second Faraday rotator and the WDM are further disposed in relation to each other and contoured such that, the first combined exit beam passes through the second beam angle turner and exits the third wedge and follows an exit beam path intersecting the third wedge opposite the second Faraday rotator, the second combined exit beam passes back through the second beam angle turner and exits the third wedge opposite the second Faraday rotator and joins the exit beam path, light of the first wavelength reflected back along the exit beam path passes through the second beam angle turner and passes through the WDM, and light of the second wavelength that is reflected back along the exit beam path passes through the second beam angle turner, is reflected from the WDM and passes again back through the second beam angle turner and exits the third wedge without interfering with either the third or fourth incident beams;

wherein the first and second wedges, the first Faraday rotator and the WDM are further disposed in relation to each other and are contoured such that the reflected light of the first wavelength, that is reflected back along the exit beam path through the second beam angle turner and the WDM, passes through the first beam angle turner and exits the first wedge without interfering with either the first or second incident beams;

whereby the first combined exit beam comprising the first and second incident beams of the first wavelength and the second combined exit beam comprising the third and fourth incident beams of the second wavelength are combined into a third combined exit beam that follows the exit beam path and that includes the first and second wavelengths; and whereby reflected light reflected back along the exit beam path is isolated from the first, second, third and fourth incident beams.

37. The method according to claim 36, wherein:
each of the first, second, third, and fourth wedges is contoured so as to have an optic axis with a prescribed orientation;
the optic axes of the first and third wedges are oriented in a first direction;
the optic axes of the second and fourth wedges are oriented in a second direction; and
the first direction forms an angle of 45° with the second direction.

38. The method according to claim 36, wherein:
each of the first, second, third, and fourth wedges is contoured so as to have an optic axis with a prescribed orientation;
the optic axes of the first and third wedges are oriented in a first direction;
the optic axes of the second and fourth wedges are oriented in a second direction; and
the first direction forms an angle of 135° with the second direction.

39. The method according to claim 36, wherein the first, second, third, and fourth wedges are composed of $YVO_4$, Rutile, Calcite, $LiNbO_3$, or any other birefringent crystal.

* * * * *